United States Patent
Ben-Ami et al.

(10) Patent No.: US 8,526,620 B2
(45) Date of Patent: Sep. 3, 2013

(54) METHOD AND SYSTEM FOR SECURE DATA COLLECTION AND DISTRIBUTION

(75) Inventors: Hadas Ben-Ami, Netanyah (IL); Leon Portman, Rishon Lezion (IL); Dvir Hoffman, Kfar Saba (IL); Oren Fisher, Tel Aviv (IL)

(73) Assignee: Nice-Systems Ltd., Ra'anana (IL)

( * ) Notice: Subject to any disclaimer, the term of this patent is extended or adjusted under 35 U.S.C. 154(b) by 32 days.

(21) Appl. No.: 12/956,065

(22) Filed: Nov. 30, 2010

(65) Prior Publication Data

US 2011/0126012 A1 May 26, 2011

Related U.S. Application Data

(63) Continuation of application No. 11/519,971, filed on Sep. 13, 2006.

(51) Int. Cl.
*G06F 21/00* (2013.01)

(52) U.S. Cl.
USPC .............. 380/277; 726/26; 713/150; 380/286

(58) Field of Classification Search
None
See application file for complete search history.

(56) References Cited

U.S. PATENT DOCUMENTS

| 5,231,666 | A | * | 7/1993 | Matyas | 705/75 |
|---|---|---|---|---|---|
| 6,751,728 | B1 | * | 6/2004 | Gunter et al. | 713/153 |
| 6,947,556 | B1 | * | 9/2005 | Matyas et al. | 380/29 |
| 7,165,180 | B1 | * | 1/2007 | Ducharme | 713/182 |
| 7,925,889 | B2 | * | 4/2011 | Blair | 713/189 |
| 2003/0084003 | A1 | * | 5/2003 | Pinkas et al. | 705/71 |
| 2005/0021469 | A1 | * | 1/2005 | Han | 705/51 |
| 2006/0126850 | A1 | * | 6/2006 | Dawson et al. | 380/284 |
| 2007/0263785 | A1 | * | 11/2007 | Williams et al. | 379/67.1 |
| 2010/0153548 | A1 | * | 6/2010 | Wang et al. | 709/224 |

* cited by examiner

*Primary Examiner* — Kambiz Zand
*Assistant Examiner* — Imhotep Durham
(74) *Attorney, Agent, or Firm* — Pearl Cohen Zedek Latzer, LLP

(57) ABSTRACT

A data provider generates a data encryption key and an identifier, uses the data encryption key to encrypt data, sends the encrypted data and the identifier to a data requestor, and sends the data encryption key and the identifier to a crypto information server. The data requestor sends the identifier to the crypto information server to request the encryption key. The crypto information server authenticates the data requestor and, contingent on that authentication, sends the data encryption key to the data requestor. If a plurality of data instances are captured, then for each instance, a respective data encryption key and identifier are generated.

23 Claims, 68 Drawing Sheets

NICE

NICE Perform™

Architecture Overview

Modular Architecture
For On Demand Deployment

Product Management          July 2004

All contents of this document are: Copyright © 2004 NICE Systems Ltd. All rights reserved.

NICE

Table of Contents

| | |
|---|---|
| Abstract | 1 |
| Overview | 2 |
| About NICE Systems | 2 |
| NICE Perform Basic Overview | 2 |
| Multi-Tier Architecture | 3 |
| Capture Tier | 4 |
|   Liability Recording | 4 |
|   Interaction Based Recording | 5 |
|   Quality Assurance Recording | 5 |
|   Record-on-Demand | 5 |
|   The Capture Platform | 5 |
|   Computer Telephony Integration | 6 |
|   Proven Platform | 6 |
|   VoIP Capturing | 7 |
|   Screen Capturing | 7 |
|   ScreenSense Recording | 7 |
|   Architecture Components | 8 |
|   The Capture Flow | 8 |
| Business Logic Tier | 9 |
|   Rules Engine | 9 |
|   Audio Analysis Engine | 9 |
|   Call Logging Server Engine | 10 |
|   Computer Telephony Integration Engine | 10 |
|   Storage Services | 10 |
| Leveraging Existing Investments | 11 |
|   Open Architecture Interface | 11 |
|   NICE Web Services | 11 |
|   NICE Application Programming Interface | 11 |
|   Remote Monitoring | 11 |
| Multi-Site Implementations | 12 |
| Distributed Architecture | 12 |
| Central Management for Distributed ACD | 13 |
| Central Architecture | 14 |
| Disaster Recovery and Business Continuity | 15 |
| High Availability Capturing | 15 |
| NICE Solution Server Clustering | 15 |
| NICE Storage Center Redundancy | 16 |

Product Management     July 2004
Architecture Overview     Modular Architecture For On Demand Deployment

Fig. 7B

NICE

List of Figures

Figure 1: Architecture Abstract Diagram .................................................................. 3
Figure 2: Capturing Platform ................................................................................... 5
Figure 3: NICE Architecture Components ................................................................ 8
Figure 4: Distributed Architecture .......................................................................... 12
Figure 5: Central Management for Distributed ACD Architecture ......................... 13
Figure 6: Central Management Architecture ......................................................... 14
Figure 7: Typical Disaster Recovery Implementation ............................................ 16

Product Management                                                    July 2004
Architecture Overview                       Modular Architecture For On Demand Deployment

Fig. 7C

NICE

Abstract

One of the major challenges that enterprises face today is to deploy new business processes and rules rapidly, while being supported by the corresponding IT processes and infrastructure. This requires a flexible infrastructure that supports the fast adoption of new processes and needs. An infrastructure that is reliable enough to eliminate down time, scalable enough to support fast growth in a demanding business environment, and flexible enough to provide a secure support for new and changing services.

NICE's proven architecture has been successfully implemented in over 30,000 installations worldwide. This experience is constantly reinvested into our solution to ensure that our customers benefit from proven knowledge and performance.

The new NICE Perform system offers new benefits and insights to all levels in the organization, utilizing the innovative capabilities in recording, monitoring, audio analysis and post-call options.

NICE Perform architecture is totally scalable, allowing customer implementations to grow and expand as their company grows. NICE Perform can be easily incorporated into existing environments.

NICE Perform architecture offers improved flexibility with a range of add-on applications and can be used in a wide range of environments. As it is based on industry standards, customers can leverage existing investments by implementing new technologies as they emerge.

NICE Perform is unique in its ability to handle heavy traffic loads, and offers a sophisticated and reliable distributed operating option.

As the only vendor that designs its own recording cards, NICE offers the most proven and robust capturing platform specifically designed to meet customers' recording needs.

Product Management — July 2004
Architecture Overview — Modular Architecture For On Demand Deployment

Fig. 7D

NICE

Overview

Today's dynamic business environment is characterized by multiple interactions. In every organization people interact with each other to create value which serves them all. If properly utilized, these interactions, particularly with customers, can yield insights that provide enterprises with more, and more valuable, information resources. Whether in the contact center, the legal department, finance, marketing, sales, customer support, operations and management or elsewhere, insights from interactions improve and drive performance.

NICE Perform provides a reliable infrastructure for the capture, monitoring, and analysis of raw interaction data, and the creation of insights from these data. The NICE Perform platform utilizes a scalable and extremely flexible multi-tier architecture, which is based on industry standards to support the NICE application suite and evolving business needs.

About NICE Systems

NICE Systems is the global provider of advanced solutions and consulting services that drive performance and enhance security. NICE solutions extract the value hidden within multimedia interactions and utilize multi-dimensional analytics for proactive decision making and strategic planning. NICE has more than 15,000 customers in over 100 countries, including the world's top ten banks and over 65% of the Fortune 100.

NICE has an impressive record of developing innovative cutting-edge technologies, some of which have become industry standards. These include patented VoIP, High Availability N+1 capturing unit, Storage Center, Content Analysis and more. NICE has won more than thirteen product awards over the last three years.

In an increasingly complex world, every enterprise needs to understand the impact of interactions on its ability to perform. NICE leads the industry with inventive solutions that enable enterprises to generate insight from interactions that drive their performance.

NICE Perform Basic Overview

NICE believes that organizations should dedicate their efforts to their core activities in order to meet the major challenges that they face today, including the need to deploy new business processes and rules rapidly and cheaply, using existing processes and infrastructure as far as possible. NICE Perform is a key tool in achieving this end.

Built on an advanced open architecture, the unique NICE Perform solution delivers multi-dimensional analytics of a wide variety of information sources, housed within a single unified data warehouse. An advanced set of Business Logic engines work on top of the central information source to generate sophisticated analytics, with state of the art visualization techniques.

Fig. 7E

NICE

Multi-Tier Architecture

NICE Perform's architecture offers a highly flexible implementation based on a customer's specific needs, and supports new demands as they emerge. At the same time it leverages industry standards to reduce management and maintenance costs. NICE Perform architecture boosts the functionality of NICE's application suite to give users even greater benefits.

NICE Perform's architecture includes the following main tiers:

- Applications Tier: Application services that enable comprehensive business insight with rich user experience.
- Business Logic Tier: Multi-engine process tier that transfer interaction into business knowledge.
- Multi Media Capture Tier: Capture of multi-media business interaction.
- Database Services: A comprehensive database services for interaction related data including data mining capabilities.
- Storage Services: An advanced business driven archiving services utilizing leading industry storage technologies.

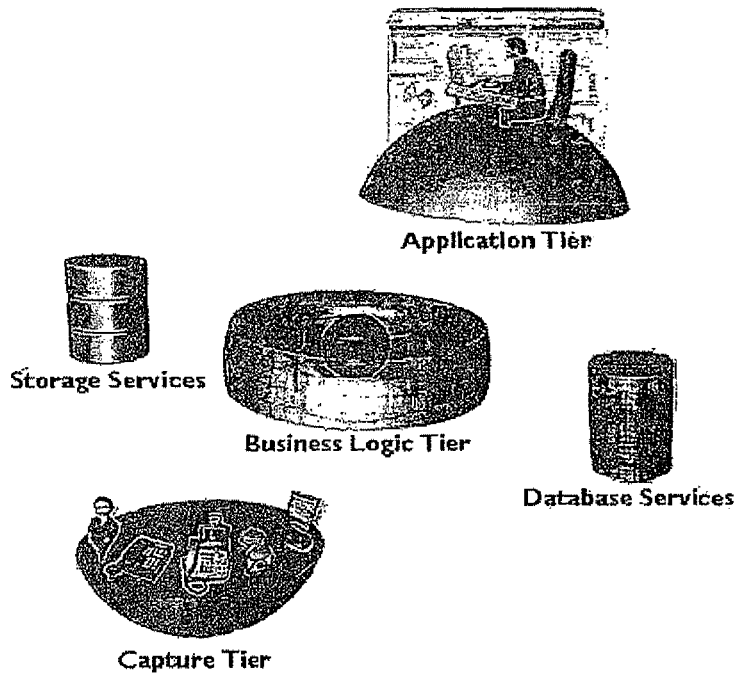

*Figure 1: Architecture Abstract Diagram*

Product Management July 2004
Architecture Overview Modular Architecture For On Demand Deployment
Page 3 of 17

Fig. 7F

NICE

The Capture Tier receives inputs from multiple sources such as:
- PBX, using different capturing methods such as Extension/Trunk side, dedicated link or VoIP.
- User's screen.
- Chat and emails.
- Screen events and user's input.
- CRM entries.
- DTMF events.

The Business Logic Tier resides on top of the Capture Tier and interfaces with the Application Tier. The Business Logic Tier receives its input from a variety of resources such as:
- Business rules defined by the user.
- CTI events.
- Storage rules.
- External information including API.
- Database services The database and the storage services provide comprehensive services for the Multi Media capturing and the Business Logic Tiers. NICE flexible and scalable architecture enables both the storage and database services to reside locally or remotely, serve one or more environment and scale rapidly as business needs dictates.

The Applications Tier is based on Microsoft .NET framework utilizing .NET advanced capabilities for high performance, security and rich user experience. The Application Tier communicates with the Business Logic tier to provide the user with a Web based management interface and advanced capabilities such as monitoring, reporting, Business Analysis utilities and more.

This tier contains the NICE application suite, which includes NiceUniverse®, NICE Feedback™, ScreenSense™, NICE Coaching and more. More detailed information can be found in other NICE Perform documentation.

Capture Tier

For over 15 years NICE has provided proven recording technology with over 30,000 installations at more than 15,000 customers world wide, including 67% of all Fortune 100 companies. NICE's capturing platform offers flexible architecture that meets a company's needs as they evolve, giving you the ability to quickly respond to new market challenges.

NICE's capturing platforms run on Microsoft® Windows® operating systems, offering a variety of capturing methods to meet different needs, as outlined below.

Liability Recording

Liability Recording records all calls all the time, for operations that require continuous recording for compliance, risk-management and dispute management purposes. NICE Liability capturing is CTI independent. Furthermore, users can define a *Recording Block of Time*, to enable recording during pre-defined business activity hours without the need to compromise on the benefits of comprehensive liability recording.

Fig. 7G

NICE

Interaction Based Recording
Rule based recording using an extensive CTI parameters and business data. This solution enables users to choose which interactions are recorded based on CTI data, including but not limited to, DNIS, 1-800 numbers for specific campaigns such as up-sale, marketing promotion etc; based on specific agents or caller ID, business data as well as additional scheduling options such as length and/or type of recording and call direction.

Quality Assurance Recording
Quality Assurance (QA) capturing methods are designed to assess and improve the quality of customer service provided by contact center agents. Through automated random capturing, online evaluation and comprehensive reporting, agents and managers can team up to set, meet and exceed quality service levels. Capturing is automatically initiated for calls selected for quality management purposes, and end users are able to playback the captured interaction directly from their desktops.

Record-on-Demand
NICE's Recording-On-Demand (ROD) solution enable agents to manually control recording in real-time, as calls occur. This feature is useful in a variety of situations from sales verification to the recording of malicious calls. Agent can define whether to record only the current call, current and next call or all calls, thus simplifying ROD management, this in addition to the ability to add data tags to a call. NICE open architecture provides the ability to integrate these capabilities into the customer application.

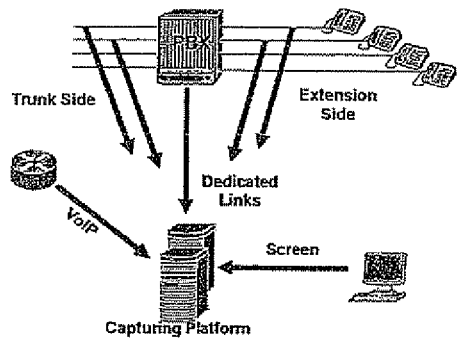

*Figure 2: Capturing Platform*

The Capture Platform
NICE's flexible capturing platforms supports blended environments, allowing the capture of digital, analog, VoIP and more, in one environment.

Each capturing unit can interface with more than 1500 channels. The Capture Tier then decides which of these channels to record at any given time, based on pre-defined criteria, such as agent schedules, specific DNIS, and so on. This allows the capture of all interactions that a customer needs without having to establish dedicated channels for recording in advance.

Fig. 7H

NICE

NICE capturing units offer stereo recording which improves the capturing quality and enables an industry-leading advanced audio analysis.

A single capturing unit can capture up to 480 channels concurrently on the "Trunk Side", in addition to its ability to perform extension side capturing and support mixed methods concurrently (with stereo recording capabilities) in a single capturing unit.

Due to its modularity and scalability, there is no actual limit on the number of channels NICE's capturing platform can support in any given customer environment. This enables customers to scale its solution to accommodate both small and large environments by simply adding capturing units as needed.

NICE capturing units offer stereo recording which improves the capturing quality and enable advanced audio analysis.

NICE's capturing platform offers a wide range of industry standard voice compression algorithms, including G.729 and G.723 providing a compression rate of 5.3kb/s, offering all the benefits of low network utilization in addition to reduced storage.

Computer Telephony Integration

NICE's capturing platform offers integration with a vast number of Computer Telephony Integration (CTI) switches. Customers can deploy NICE's capturing platform with a full range of vendor's switches, where each recorded interaction is related to the corresponding Call Related Information (CRI). Using CRI, NICE's capturing platform can apply business rules and processes to the capturing process in real-time.

Using NICE solutions, customers can receive and analyze a large number of parameters from traditional or IP telephony infrastructures, including, hold time, talk time, queue time, wrap-up time, abandon from hold and many more, and then link all of them to the actual call and context of the call.

Proven Platform

NICE offers a proven and robust platform, designed to meet specific capturing needs while considering the requirements of both current and future technology. NICE has specifically and exclusively designed its boards for recording. This provides our customers with a proven and robust capturing platform that offers unmatched advantages, including:

- Designed For Recording – NICE has a proven record of its long term commitment to supply customers with spare parts, service and scalability for many years to come, with a long term hardware investment protection commitment.
- Highest Reliability and Availability – NICE's capturing unit offers the highest recording density per unit and the highest density per board. The amount of boards used per system has a direct effect on the average failure rate. Therefore, the lower the number of boards and components required per unit, the higher the availability that can be offered.
- Full Solution Certification – Customers are highly aware of the importance of having fully certified solutions in terms of safety, telecommunications and Electromagnetic Interference (EMI) approvals. Only a turnkey solution can provide such certification; a solution built in the field from certified boards and certified servers does not add up to a certified platform. NICE not only offers certified components but a complete certified solution.

Fig. 7I

NICE

VoIP Capturing

NICE's patented VoIP capturing solution provides a full range of recording options, including Liability, Interaction based and Recording on Demand. NICE VoIP capturing is also offered as a software-only solution, utilizing standard network interface cards for interfacing with audio that leverage any industry standard server.

The system works seamlessly with blended (traditional and VoIP) environments and is fully integrated with NICE's Application platform. Using NICE VoIP customers can record across new communication channels, while capturing and analyzing interactions for compliance or quality management. As with other NICE capturing platforms, VoIP is scalable and can support a virtually unlimited number of recording channels.

NICE offers two main methods for VoIP capturing:

- Passive VoIP Method: Connects to ports in the network switches that are configured to mirror the VoIP transportation. It then filters and records the audio packets sent to and received from the IP addresses of the VoIP phones being recorded. NICE VoIP capturing supports recording of IP phones with static or dynamic IP addresses.
- Active VoIP Method: Uses data forwarding mechanisms to send audio packets directly from the telephony to the capturing platform's address. This method is independent of the network switches' mirroring capabilities, and provides a software-only recording solution for all other phone types as well as IP phones.

Screen Capturing

Screen data capture is done via NICE ScreenAgent, which is installed on each workstation.

While all Microsoft operating systems are supported, there are major differences in the graphics and video architecture between Windows XP/Windows 2000, Windows NT and Windows 95/98/Me (9x). NICE therefore developed different capturing mechanisms for each operating system, optimizing the screen capturing capability for any customer's environment without compromising on quality. NICE's screen capture application offers normal or advanced compression methods thus reducing network bandwidth load and storage capacity and includes support for Microsoft terminal-server environments as well as Citrix solutions.

NICE solution offers multi-site screen archiving where all screen captures can be centrally stored and managed. NICE screen capturing supports a wide range of capturing options including Liability Recording, Interaction Based Recording Live Monitoring and ROD.

NICE's Screen Capturing platform is designed to support a mass installed base. Its scalability and modularity allows it to support an almost unlimited number of workstations concurrently.

ScreenSense Recording

NICE's innovative screen-based capturing capability allows users to capture or tag any type of interaction (including voice, VoIP, chat, email, and co-browsing), based on the agent's screen activity or any type of information that appears on the screen (customer name, segmentation, monthly bill, and so on). An open architecture means that the system is totally interoperable with virtually any homegrown or third-party application including, CRM, ERP, e-Learning, email/Chat and Help-Desk applications. In addition, ScreenSense is

Fig. 7J

NICE platform independent and supports both browser based Web applications and traditional client-server applications.

Architecture Components

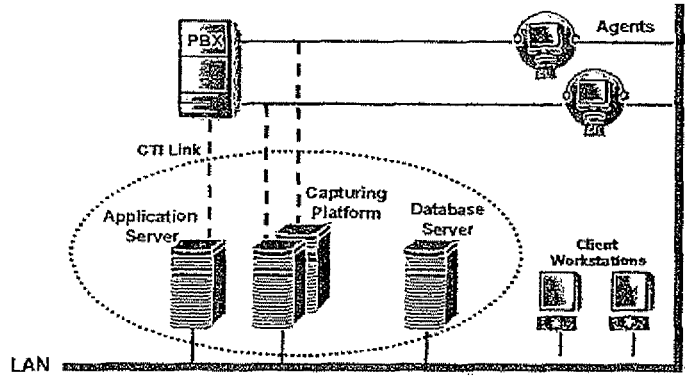

*Figure 3: NICE Architecture Components*

The units shown in Figure 3 provide a typical illustration of the system's physical architecture. Workstations communicate with the application server only, thus providing real three tier communication which greatly enhances security and performance.

Based on the site's size and reliability needs, a solution which is composed of more or fewer servers can also be offered. NICE's modular architecture also enables components to reside on a different dedicated industry standard servers.

- Capturing Platform: Can be of any type to capture voice, screen, mail, VoIP, chat and more, and supports mixed environments. Scalability is achieved by simply adding additional capturing units as required. The capturing units runs on a Windows operating system.
- Applications Server: Contains the NICE's application suite, which includes NICE Universe, NICE Feedback, ScreenSense and the Web application services. It may also contain the application database, Storage Center, Audio Analysis and the Rule Manager modules – depending on each site's size and reliability needs. The application server runs on any industry standard Windows server.
- Database Server: maintains all interaction-related data including CTI events. The database serves advanced analytic processing for business statistics and analysis, which utilizes advanced data mining capabilities.

The Capture Flow

Interactions are captured according to the user definition concerning what and when to capture, and are buffered at the capturing unit's hard disk.

Fig. 7K

NICE

Based on the user rules and retention definition, the interaction is either moved to the Storage Center for archiving or remains on the capturing unit until additional space is needed for new capturing.

Further processing such as Audio Analysis, reporting, playback and other capabilities offered by the Application Tier, can be initiated regardless of whether the interaction still resides on the capturing unit or is already archived.

*Business Logic Tier*

The Business Logic Tier is a robust mid-tier that receives input and information from the user's environment and applies business and pre-defined rules into Storage, Intelligent Analysis, Reporting and other services. It functions as an interface for NICE's Application Tier.

The Business Logic Tier comprises several engines modules such as the Rule Manager, CTI, CLS and the Audio Analysis engine. These engines interact with the database and with each other to create a dynamic and flexible mid- tier, with total separation between the Capturing and Applications tiers.

The Applications Tier, as well as third party integrations via NICE's open interface, communicates solely with the Business Logic Tier, and not with the Capture Tier. This behavior enhances NICE's architecture's flexibility and improves its security capabilities.

The Business Logic Tier leverages industry standards by running on any third party Windows based server and uses Microsoft's SQL database. Calls information is stored on a simple to manage SQL database scheme that is used for evaluation, intelligent analysis processing, archiving rules and more.

Rules Engine

NICE's rules engine is a centralized module that allows users, via the Application Tier, to define recording and call-tagging rules. It also lets users schedule recordings, define audio analysis rules, build scoring formulas, define classifications and storage rules. Users can focus on different parts of the organization and define the appropriate rules for each group. This allows business processes and rules to be implemented through NICE's architecture.

Audio Analysis Engine

NICE's award-winning solution include capabilities that combine technologies such as word spotting and stress/emotion analysis to enable users to extract strategic business intelligence from customer interactions. NICE's new capturing platform offers a real cost-performance solution for all call recording with added audio analysis capabilities.

- Word Spotting: Automatically searches for predefined words and phrases, and enables a manual search for additional words and phrases if the user wants to search further. Word spotting lets users locate critical words, identify competitors, detect customer's intentions, monitor agent compliance with policies and evaluate the effectiveness of campaigns and sales programs.
- Emotion Detection: Understands the context of the conversation; spots stress-related calls from either the customer or agent side and identifies what is behind the emotion.
- Talk Analysis: Provides an understanding of the context and intention of each party to the call as the conversation takes place. Talk Analysis pinpoints periods of silence and overlaps that

Fig. 7L

NICE occur between the agent's and customer's voice, as well as calculating the percentage of the call dominated by either party during the interaction.

The Audio Analysis engine communicates with the Capture Tier in addition to other engines such as the Storage Center and the Rule Manager. This gives users the flexibility to apply Audio Analysis rules using the Rules engine and also to perform analysis on archived interactions as an offline process via the Storage Engine during off-peak hours.

Call Logging Server Engine

The Call Logging Server (CLS) engine interacts with other engines determining in real time when, what and how to capture. The CLS engine is integrated with almost any telephony switch in the market.

The CLS engine responses to rules and user events, to initiate the capturing process while interacting with several components such as the PBX, Database for CTI information insertions, and the capturing platform to initiate capturing. The CLS engine then decides based on its scheduler and CTI events which interaction to capture and how to capture, whether it is a voice, screen, VoIP and more.

Computer Telephony Integration Engine

NICE advanced Computer Telephony Integration (CTI) engine processes and analyzes CTI information. This forms the basis for advances business analysis and actionable business performance data. Based on predefined parameters and rules, the CTI engine performs an advanced CTI analysis and business analytic. This is then translated into business improvement recommendations, increasing efficiency and improving business performance using the NICE application suite.

Storage Services

NICE's Storage Center enables users to manage and administrate archiving and retrieval tasks using a simple and intuitive user interface. The Storage Center communicates with the Capture Tier. It pulls all the captured data, according to the pre-defined storage rule, from the capturing unit's disk cache and archives it on any available media.

The Storage Center's open architecture offers a wide range of integration options with leading storage vendors to leverage existing storage infrastructure and advanced disaster recovery technologies. The Storage Center can utilize a vast range of archiving media such as DVD, tape drive, Disk RAID, jukeboxes and more. In addition the Storage Center can use smart Hierarchical Storage Management (HSM) solutions for efficient resource management.

NICE's Storage Center provides an advanced scheduling mechanism that avoids archiving during peak hours, and supports any storage architecture, including SAN, NAS, DAS or CAS. It provides a central archiving solution for multi-site or remote branch recording and offers advanced Disaster Recovery and Business Continuity capabilities.

The Storage Center's archiving storage capacity is solely determined by the enterprise's limitations in terms of storage costs and regulatory compliance.

NICE's Storage Center offers real flexibility by allowing the user to determine:

- What to archive, based on any existing information in the system (CTI or external).
- When to archive, using an advanced scheduler.

Fig. 7M

NICE

- Where to archive, by selecting either single or multiple SAN, NAS, DAS or CAS locations for disaster recovery purposes.
- How to archive, by assigning retention for each interaction, choosing the compression type, and selecting whether to use a third party archiving method by utilizing integrations with leading storage and backup vendors.

*Leveraging Existing Investments*

Open Architecture Interface

NICE's open architecture enables customers to integrate CRM, WFM and home grown applications into NICE's solution. NICE provides two main integration interfaces:

NICE Web Services

NICE's application is based on .NET framework and offers advanced integrated capabilities. Users can plug any capability into virtually any Web based application or homegrown Web application using NICE's Web Services modules. In addition COM and XML interfaces are also offered, delivering a wide range of capabilities to leverage NICE solution into the customer's environment.

NICE Application Programming Interface

NICE Application Programming Interface (API) provides a set of capabilities through a native API, which enables customers to integrate any third-party application and apply almost any capability offered as part of the NICE solution (such as playback, adding business data and recording) into their environment

Remote Monitoring

One of the most effective means of remotely managing a network is via the Simple Network Management Protocol (SNMP). Using SNMP, a network manager can remotely manage and control components on a TCP/IP network.

NICE has enhanced its support of SNMP within its architecture. This provides the network manager with the power to remotely monitor NICE components, thereby enabling the highest standard of quality for a powerful and reliable system. NICE's integration with SNMP applications focuses on the development of SNMP agents for different types of servers that form the basis of the NICE solution. SNMP intelligent agents gather, identify, filter and report data concerning the status of NICE components in each tier.

By implementing SNMP as part of the monitoring infrastructure, customers can use any SNMP manager application, in order to track and manage their environment. In addition, NICE provides a ready to use SNMP management integration solution that is pre-configured and custom

Fig. 7N

NICE

Multi-Site Implementations

NICE's flexible architecture provides the tools to create and control multi-sites, whatever their number and their geographical dispersion. Recognizing the variety of multi-site implementations and emerging technologies in this area, NICE provides an advanced and flexible architecture designed to meet each customer's specific needs.

Distributed Architecture

NICE's distributed architecture creates a single, large virtual site that is responsible for management and control. It enables centralized voice and screen archiving and provides for the playback of interaction (regardless of physical location) as well as centralized application and user management. Global monitoring and server granularity monitoring are provided as part of NICE's distributed architecture. If the connection to the central site is lost, each site can still operate independently.

All site databases are synchronized to a central database that holds all CTI and business information, enabling centralized management and a unified data view at any given time.

NICE's distributed architecture enables users to login from any site. User access is based on the existing permissions and attributes that are defined in the originating site.

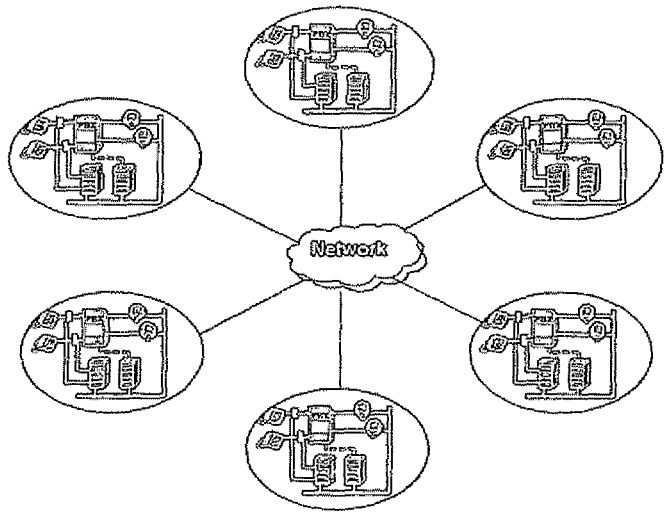

*Figure 4: Distributed Architecture*

A major requirement for multi-site customers is central management. Central management reduces costs and simplifies management. The Business Logic Tier is designed to support multi-site environments, allowing multiple independent capturing systems to be managed from one central location.

Fig. 70

NICE

Taking into account the variety of multi-site configurations, NICE offers flexible architecture deployment that meets customer's specific needs with unmatched advantages:

- Scalable: From the most simple two-branch site, up to a virtually unlimited number of sites with centralized administration, query, evaluation and playback, enterprise reports, enterprise storage, and more.
- Flexible: Hosted or networked sites and remote branch solutions that include centralized management. Supports all PBX environments including, traditional, VoIP and mixed environments.
- Proven Capabilities: Numerous case studies and large successful implementations.
- Enterprise Administration: Reduces operation and maintenance costs.
- Enterprise Storage: Full storage solution.
- Unified Query: Queries across multiple sites

Central Management for Distributed ACD

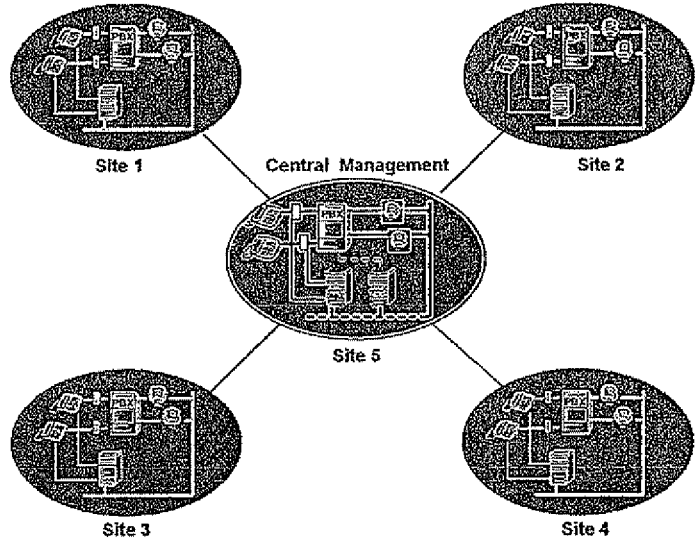

Figure 5: Central Management for Distributed ACD Architecture

Customers with many branches can leverage NICE Solution for central management of a distributed Automatic Call Distribution (ACD), offering a cost-effective, easy-to-maintain recording system.

NICE architecture offers easy capture at local sites or branches for a range of purposes such as liability, interaction-based recording and so on. The captured data is cached locally at each branch on the capturing unit's hard disk and transferred to a central site hosts a central database and storage center.

Fig. 7P

NICE

NICE's central architecture creates one large virtual site that is responsible for management and control. Monitoring can take place both locally and remotely depending on the site's setup. During off-peak hours, data is downloaded over a WAN from the local branches to the storage center at the central site.

Central Architecture

NICE's central architecture eliminates the need to have any of the capturing units. Components present in the branches, as capturing is performed at a central site.

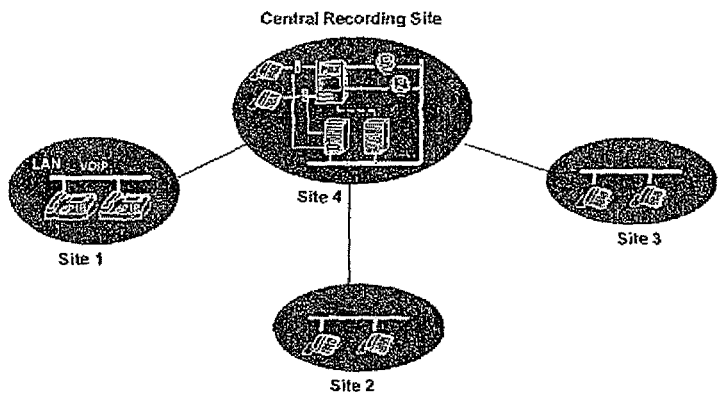

Figure 6: Central Management Architecture

This solution is especially useful for companies that have numerous, small branch offices located at different sites. The branch offices generally have a limited number of employees, a small switching system, and limited communication and IT resources.

A variety of capturing methods including observation are supported by the central architecture. In addition, customers using VoIP can benefit from central recording, thus providing a truly flexible central architecture.

Fig. 7Q

NICE

Disaster Recovery and Business Continuity

In today's environment, it is clear that an enterprise's survival is dependant on its ability to recover from any potential disaster, and all the more so when it comes to enterprises that operate 24/7 all year round, where continuous uptime is mandatory, NICE's architecture offers the optimal solution that is based on a customer's specific environment and needs.

*High Availability Capturing*

NICE provides failure tolerance using our patented N+1 capturing architecture.

The essence of the configuration is the provision of a standby capturing unit. Should one or more of the capturing units fail, the standby immediately takes over to ensure a seamless transfer with no down time or information loss.

Implementing high availability at the Capture Tier does not affect or require changes in other tiers, and supports all capturing methods including VoIP. It is transparent to both the Business Logic and Applications Tiers, thus maintaining real flexibility and user transparency.

Given the low probability of failure in a given capturing unit, one hot-standby capturing unit can be configured as a standby for multiple capturing units rather than having one per unit. This revolutionary NICE patented design creates a system without any single point of failure. System recording remains uninterrupted in case of a device failure, and all interaction recording is preserved.

Using NICE's high-density capturing units, customers can deploy 1+1 architecture with a smaller footprint while retaining simple implementation. In a 1+1 configuration two units capture the same interaction, providing high availability capturing. Failure of one of the units does not impact the other, thus no loss of capturing occurs.

NICE capturing units can be equipped with Hot Swap RAID-5 and a power supply to further enhance their capacity in a high-availability environment.

*NICE Solution Server Clustering*

The NICE database cluster solution leverages Microsoft's SQL and operating system server and enables a robust environment by providing for database server redundancy. In a cluster environment two dedicated servers are configured as database servers and the database is located in a shared directory. In case one server fails, the other server automatically takes over; thereby providing continuous recording of data in the database. This solution is transparent to the users at the site and does not require the implementation of new processes.

In addition, for business continuity purposes, the NICE Server Clustering solution enables local databases to be replicated and synchronized with the database located at the remote disaster recovery site. This can be implemented as part of NICE's Professional Services offering.

Fig. 7R

NICE

NICE Storage Center Redundancy

NICE's Storage Center provides redundancy capabilities for both archiving and retrieval.

The Storage Center can be configured as a redundant for one or more units or for a specific archiving job. In the event of failure, the redundant Storage Center takes over and resumes archiving. The process is the same for retrieval; if a user requests an interaction to be played back while the primary Storage Center is down; the request is automatically redirected to the redundant Storage Center, thus maintaining full transparency.

Storage Center supports all the leading storage vendors, and can further leverage their disaster recovery capabilities.

The most common NICE Disaster Recovery implementation consists of a primary Storage Center installed at the main site and a redundant Storage Center installed at the Disaster Recovery site as depicted in Figure 7.

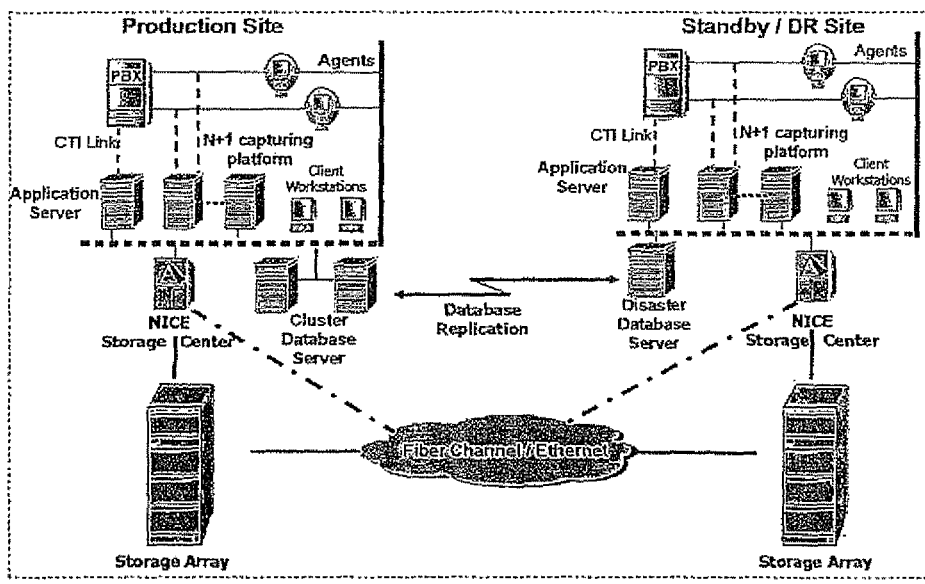

Figure 7: Typical Disaster Recovery Implementation

Fig. 7S

NICE

Disclaimer

Information in this document is subject to change without notice and does not represent a commitment on the part of NICE Systems Ltd. The systems described in this document are furnished under a license agreement or nondisclosure agreement.

All information included in this document, such as text, graphics, photos, logos and images, is the exclusive property of NICE Systems Ltd. and protected by United States and International Copyright laws.

Permission is granted to view and photocopy (or print) materials from this document for personal, non-commercial use only. Any other copying, distribution, retransmission or modification of the information in this document, whether in electronic or hard copy form, without the express prior written permission of NICE Systems Ltd., is strictly prohibited. In the event of any permitted copying, redistribution or publication of copyrighted material, no changes in or deletion of author attribution, trademark legend or copyright notice shall be made.

360° View, Agent@home, Executive Connect, Executive Insight*, Experience Your Customer, Investigator, Lasting Loyalty, Listen Learn Lead, MEGACORDER, Mirra, My Universe, NICE, NiceAdvantage, NICE Analyzer, NiceCall, NiceCLS, NiceCMS, NICE Feedback, NiceFix, NiceGuard, NICE Learning, NICE Link, NiceLog, NICE Playback Organizer, Renaissance, ScreenSense, NICE Perform, NiceScreen, NiceSoft, NICE Storage Center, NiceTrack, NiceUniverse, NiceUniverse LIVE, NiceVision, NiceVision Harmony, NiceVision Mobile, NiceVision Pro, NiceVision Virtual, NiceWatch, Renaissance, Secure Your Vision, Tienna, Wordnet and other product names and services mentioned herein are trademarks and registered trademarks of NICE systems Ltd. All other registered and unregistered trademarks are the property of their respective owners.
* For Australia only.

Product Management    July 2004
Architecture Overview    Page 17 of 17
All contents of this document are: Copyright © 2004 NICE Systems Ltd. All rights reserved.

Fig. 7T

NICE

NICE Perform™

Solution Overview

NICE

Disclaimer
Information in this document is subject to change without notice and does not represent a commitment on the part of NICE Systems Ltd. The systems described in this document are furnished under a license agreement or nondisclosure agreement.
All information included in this document, such as text, graphics, photos, logos and images, is the exclusive property of NICE Systems Ltd. and protected by United States and International Copyright laws.
Permission is granted to view and photocopy (or print) materials from this document for personal, non-commercial use only. Any other copying, distribution, retransmission or modification of the information in this document, whether in electronic or hard copy form, without the express prior written permission of NICE Systems Ltd., is strictly prohibited. In the event of any permitted copying, redistribution or publication of copyrighted material, no changes in or deletion of author attribution, trademark legend or copyright notice shall be made.
360° View, Agent@home, Executive Connect, Executive Insight*, Experience Your Customer, Investigator, Lasting Loyalty, Listen Learn Lead, MEGACORDER, Mirra, My Universe, NICE, NiceAdvantage, NICE Analyzer, NiceCall, NiceCLS, NiceCMS, NICE Feedback, NiceFix, NiceGuard, NICE Learning, NICE Link, NiceLog, NICE Perform, NICE Playback Organizer, Renaissance, ScreenSense, NICE Perform, NiceScreen, NiceSoft, NICE Storage Center, NiceTrack, NiceUniverse, NiceUniverse LIVE, NiceVision, NiceVision Harmony, NiceVision Mobile, NiceVision Pro, NiceVision Virtual, NiceWatch Renaissance, Secure Your Vision, Tienna, Wordnet and other product names and services mentioned herein are trademarks and registered trademarks of NICE systems Ltd. All other registered and unregistered trademarks are the property of their respective owners.
* For Australia only.

Product Management                                                                      October 2004
            All contents of this document are: Copyright © 2004 NICE Systems Ltd. All rights reserved.

Fig. 8A-2

NICE

Table of Contents

Abstract .................................................................................................... 1
Overview: The Challenges of Service-Providing Organizations ......... 2
Insight from Interactions ........................................................................ 3
   Who Benefits? ...................................................................................... 3
NICE Perform Tools ................................................................................ 5
   Capturing Audio and Screens ............................................................. 5
   The Audio Analysis Engine .................................................................. 6
   Call Flow Events ................................................................................... 6
   Agent Screen Activity .......................................................................... 6
   Customer Surveys ............................................................................... 7
NICE Perform Modules ........................................................................... 8
   How the NICE Perform Web Applications Work .............................. 8
      The Business Performance Portal ................................................. 8
      Business Analyzer ............................................................................ 9
      Coaching ......................................................................................... 13
      Reporter ......................................................................................... 14
      Advanced Analysis Tools .............................................................. 16
      Rules Manager .............................................................................. 17
      NICE Monitor ................................................................................. 20
   Administrative Tools ......................................................................... 21
      Survey Manager ............................................................................ 21
      User Administrator ....................................................................... 21
      System Administration ................................................................ 22
      Lexicon Manager .......................................................................... 22
Afterword .............................................................................................. 24

Product Management                                        October 2004
NICE Perform

Fig. 8A-3

NICE

Table of Figures

Figure 1: NICE Business Analyzer ............................................................... 5
Figure 2: Searching for Calls with an Advanced Query ................................. 6
Figure 3: My Universe Window ................................................................... 9
Figure 4: Advanced Query Screen in the Business Analyzer ...................... 10
Figure 5: Query Results in the Business Analyzer ..................................... 11
Figure 6: Query Results Visualization - Business Analyzer ........................ 11
Figure 7: Playback Application - Business Analyzer .................................. 12
Figure 8: Sample Evaluation Form ............................................................ 13
Figure 9: Retention Probability Trend Report, by Month ............................ 13
Figure 10: Clip Recording Tool .................................................................. 14
Figure 11: Sample Call Type Report .......................................................... 15
Figure 12: Adherence to Script - Sample Report ....................................... 16
Figure 13: Rules Scheduler ....................................................................... 18
Figure 14: Audio Analysis Rules ................................................................ 19
Figure 15: Storage Rules ........................................................................... 20
Figure 16: NICE Monitor ............................................................................ 21
Figure 17: User Administrator Tool ........................................................... 22
Figure 18: Lexicon Manager ...................................................................... 23

Product Management                               October 2004
NICE Perform

Fig. 8A-4

NICE

Abstract

In an era where the boundaries between product, promotion, price and placement are blurred, and customer loyalty remains the only true differentiator, the challenges of service-providing organizations are further compounded. Companies dedicate valuable effort to searching for a convenient, reliable and timely method of obtaining insights about internal processes, customers and the competitive environment. Despite the investment in time and money, these efforts often lack focus and coordination. Worse still, they are often not very successful.

Paradoxically, the information is there—but the wealth of data available in customer interactions remains almost entirely untapped.

More and more of today's business is characterized by increasing reliance upon interactions conducted via telephony and web-based communications. These means of communication are becoming an important and strategic dimension of business across a broad spectrum of vertical markets. In these business environments, a great deal of information lies hidden within the ever-growing quantities of unstructured multimedia interactions. This information can provide decision makers in a variety of areas throughout the enterprise with powerful insights into their marketplace and customer base, and direct access to key business scenarios. Many of these capabilities are not available with traditional transactional-based analytics tools. They are of great value to organizations constantly searching for better ways to understand their market dynamics and customer intent, while operating within the limitations of traditional surveying and data analysis techniques and growing regulatory requirements.

NICE Perform provides the breakthrough. By analyzing interactions across an unprecedented range of parameters, NICE Perform extracts the insights that answer those questions previously considered unanswerable – across a range of vertical markets. While providing critical statistical data, NICE Perform offers a solution that goes beyond the scope of transactional analytics to help decision makers understand customer intent and market dynamics, identify current and future trends early enough for proactive management of challenges, opportunities and changes, and enhance corporate governance throughout the enterprise.

NICE Perform offers organizations a powerful tool for improving customer retention and solving many other business issues. The system's ability to analyze all aspects of interactions means that it can effectively flag calls from customers "at risk", help in analyzing campaigns effectiveness, identify inefficiencies in the Contact Center operation and much more. NICE Perform lets the organization take proactive measures to improve the overall performance.

NICE believes that organizations should dedicate their efforts to their core activities. That's why NICE Perform is designed to simplify and enhance operations. With a sophisticated, yet, easy to use solution, NICE Perform gets the right information to the right people in the organization at the right time, to be used for overall business management improvement.

That's Insight from Interactions.

Fig. 8A-5

NICE

Overview: The Service-Provision Challenge

In today's world, every organization is a service-providing organization. True, specific groups in the organization, such as sales, customer support and the contact center, are dedicated to serving customers, but the problems and achievements of its service-oriented units significantly impact the general outcome of each and every company process, from production to revenue collection, and from product design to marketing strategy.

The service-providing organization is dynamic and must be able to respond quickly to changes in its environment. In an era where the boundaries between product, promotion, price and placement are blurred, and customer loyalty remains the only true differentiator, the challenges of service-providing organizations are further compounded.

Some of the most recognizable challenges include:

- Improving customer retention – The cost of acquiring a new customer is several times higher than the cost of keeping an existing one. Therefore, low customer retention rates inevitably translate into low growth and high costs, not just for the contact center, which must process orders, but also for every single item on the balance sheet.
- Ensuring high quality at lower cost - This is common to all organizations, and the quest to lower costs while maintaining high levels of service is more crucial than ever. Companies must find ways to effectively implement quality assurance across the enterprise, especially in customer-facing operations.
- Finding a differentiator – What gives you competitive advantage? Certainly not traditional differentiators such as unprecedented speed, campaigns that can be copied, price wars, a product that can be imitated and slogans changed. Service, which is directly linked to customer loyalty, is the only remaining differentiator.
- Eliminating data overload and poor business intelligence –Resources spent on data collection are not always invested in the areas where they're needed the most. To obtain true business intelligence, companies need not only to gain access to the wealth of data potentially available, but also to be able to distinguish relevant data from unimportant material. Companies further need the ability to analyze it so that it facilitates the decision-making process.
- Neutralizing competitive threats – Dynamic organizations must keep on top of their changing competitive environment. One of the biggest challenges is trying to anticipate the tactics competitors may use to lure away their customers.
- Working as a global company – Today's business world knows no geographic boundaries, and different branches of the same organization, regardless of the physical location and possible time differences, must be able to work as one. It is imperative, therefore, to implement solutions that are fully capable of supporting multi-site systems and provide all users with real-time access to company systems, no matter where they are located.
- Providing employee training and recognition – This is particularly true for contact center agents, who, despite their low rank in the company hierarchy, deal with the most valuable of its assets: customers. Agents need to be kept up-to-date about the company's campaigns and policies, receive constant feedback on their performance, and ensure they are empowered to complete their job in the best possible way.
- Measuring campaign effectiveness – Companies spend substantial resources on collecting data from customers to evaluate the effect of a new product offering, price reduction or advertisement. However, most of the time, these evaluations are costly and do not provide immediate feedback.

Fig. 8A-6

NICE

Insight from Interactions

Companies dedicate valuable effort to searching for a convenient, reliable and timely method of obtaining information about internal processes, customers and the competitive environment. Despite the investment in time and money, these efforts often lack focus and coordination. Worse still, they are often not very successful.

Paradoxically, the information is there—but like a hidden goldmine, the wealth of data available in customer interactions remains almost entirely untapped.

Recorded customer interactions are far more than a way to comply with regulatory or liability guidelines or provide feedback to customer service representatives. With the right tools, companies can locate, extract, refine and distribute a wealth of information from their existing resources.

NICE Perform gives companies the tools to do what was previously impossible – to create insight from interactions. NICE Perform technology means lower storage costs, a much more cost effective interaction-capturing platform and retention rules ensuring that all organizations, even those that do not have to record for liability or regulation, can benefit from recording all of the interactions without requiring major investment.

NCE Perform provides efficient ways to extract the information, analyze it and visualize it in a graphically effective manner, so that all units in the organization can use it to create insights and improve overall business performance.

*Who Benefits?*

The wealth of insights obtainable from customer interactions serves far more than the contact center supervisor – it is a timely, reliable, invaluable and inexpensive source of business intelligence for the entire organization. Among other possibilities:

- Executives can now effectively measure customer retention rates and understand the true reasons behind them.
- Legal departments can receive rapid warnings of possible legal problems from analysis of customer interactions.
- Marketing directors can receive timely and reliable information on, for example, the effectiveness of a TV campaign launched only a few hours earlier.
- Contact center managers can analyze feedback to gauge and improve first-call resolution.
- Account managers can locate all the interactions belonging to a specific account, analyze problematic areas and identify major issues.
- Quality supervisors can analyze customer responses to verify that supervisors' agent evaluations reflect customer perceptions.
- Supervisors can evaluate agent interactions, from anywhere, to ensure that the required level of quality is maintained and that organization policies are followed.
- Agents can access their own evaluations, quality reports, coaching packages and any other important information about their performance from a single point, based on the privileges they have been granted. This ensures that they receive and provide ongoing feedback, and empowers them to perform better.
- Coaching specialists can quickly create and send a focused coaching package to an agent, a group of agents or the entire contact center.
- Contact center analysts can define autoscoring formula to assist users in evaluating calls or identifying those that show a specific trend.

Fig. 8A-7

NICE

In short, all units in the enterprise can benefit from the insights NICE Perform generates from interactions.

Product Management
NICE Perform

October 2004
Page 4 of 24

Fig. 8A-8

NICE

NICE Perform Tools

NICE Perform includes a complete set of Web-based tools to extract, process, analyze and effectively visualize information from customer interactions on a large scale. The information gathered through:

- Sophisticated mining rules
- Analysis engines
- Call flow events,
- Agent screen-activity
- Customer surveys Together, these resources provide the insights which until now have been unavailable from recorded interactions.

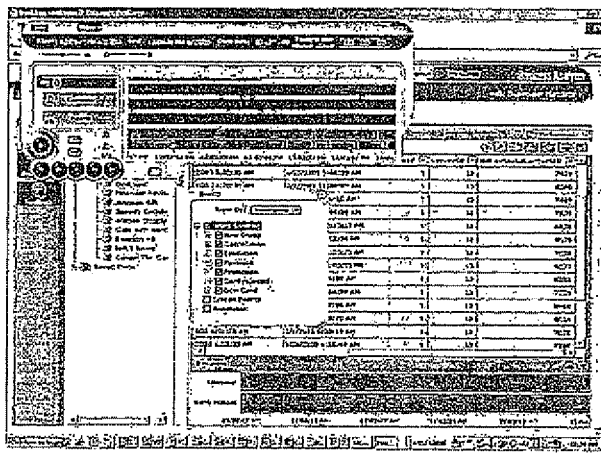

*Figure 1: NICE Business Analyzer*

When combined, these five major tools deliver unmatched ability to extract insights fro customer interactions and to use these insights to promote business success.

Capturing Audio and Screens

With up to 500 channels per recorder, high compression rates and the ability to integrate with any storage system, the NiceLog® Logger in NICE Perform provides a robust method of capturing the complete breadth of customer interactions in the contact center through fixed or random-based scheduling, event-based recording or recording of all calls. Furthermore, sophisticated rules allow the system to "listen" to calls – and keep only those the organization finds valuable.

With this advanced capturing solution from NICE, there is no longer any need to compromise by recording only a sample of the interactions with customers. For the same cost, the company can now capture all interactions (including voice and screen), have the system analyze them and, based on predefined rules, store only what is necessary. This sophisticated analysis of all calls and accessibility to any of them dramatically improves the Product Management     October 2004
NICE Perform     Page 5 of 24

Fig. 8A-9

NICE quality management process in the call center, and the response to intelligence gathering needs.

*The Audio Analysis Engine*

NICE Perform utilizes technologies such as automatic speech recognition, word spotting, and stress/emotion analysis to enable users to extract strategic business intelligence from customer interactions.

- Word spotting – Automatically searches for predefined words and phrases, and enables a manual search for additional words and phrases if required. Word spotting lets users locate critical words, identify competition, detect customer intentions, monitor agent compliance with policies, and evaluate effectiveness of campaigns and sales programs.
- Emotion detection – Understand the context of the conversation; spot stress-related calls from either the customer or agent, and identify what is behind the emotions.
- Talk analysis – Pinpoints periods of silence and overlaps between the agent's voice and the customer's voice, as well as the percentage of the call dominated by either party in the interaction.

*Call Flow Events*

With NICE Perform, organizations can receive and analyze a large number of parameters from the traditional or IP telephony infrastructure, including hold time, talk time, queue time, wrap-up time, abandon from hold and more, and then link all of them to the actual call and context of the call.

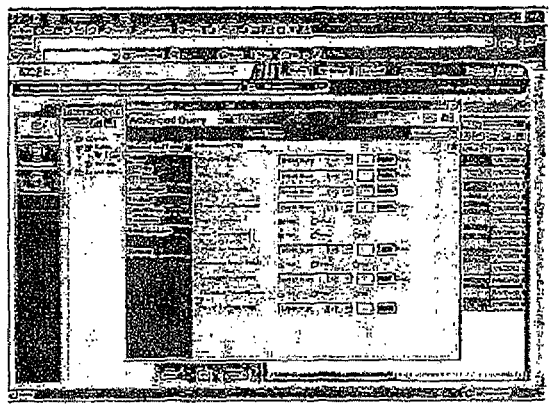

*Figure 2: Searching for Calls with an Advanced Query*

*Agent Screen Activity*

ScreenSense™ is an innovative, no-integration application that allows NICE Perform users to capture or tag any type of interaction (voice, VoIP, chat, email, co-browsing) based on agent screen activity or any type of information that appears on the screen (such as customer name, segmentation, monthly bill). It is fully interoperable with virtually any homegrown or third-party application (CRM, ERP, e-Learning, e-mail/Chat, Help-Desk

Fig. 8A-10

NICE applications and more). In addition, ScreenSense is platform independent and supports both Web-based applications and traditional client-server applications.

ScreenSense also has the power to extract any item of information from the agent's screen and store it as part of the interaction metadata field. Without integration with the application itself, organizations will be able to attach, for example, the customer name, monthly bill amount, customer classification or any other item of information from the agent's screen to the interaction data for future query or reporting needs.

The identified screen event is displayed as a tag during the playback of the call, allowing reviewers to jump to the precise moment in the interaction that the event took place.

*Customer Surveys*

NICE Feedback™ is a fully integrated, IVR-based survey solution which makes gathering of customer feedback easy and cost-effective. This post-call IVR survey is designed to obtain reliable information on the interaction from the first-hand source: the customer.

NICE Feedback helps companies to obtain timely responses from customers and compare these responses to quality monitoring scores or any other detail from the system, giving them a full picture of the customer interaction. These same surveys can also be used to collect customer feedback on products or marketing campaigns.

It also allows companies to take the advantage of the enormous number of customers that call their contact center every day (at a time that is most convenient for the caller), and asks them to stay on the line for a few more seconds to provide their feedback.

The dedicated reports in the NICE Reporter application enable automatic generation and distribution of results to anyone who needs this information. NICE effectively integrates all of these capturing, analysis and visualization tools inside NICE Perform. As a result, companies maximize the output of intelligence derived from different sources of data, saving valuable time and money, and reaching levels of insight that were not previously possible.

Fig. 8A-11

NICE

NICE Perform Modules

Contact center and enterprise applications continue to grow in number, scope and complexity. One of the most successful ways to simplify distribution and maintenance of desktop applications is the use of Web-based applications throughout the contact center.

The advantages of Web-based applications are clear, and include:

- Instant access – Supervisors and reviewers can log in through an authorized intranet connection, anytime, anywhere, without any client installation
- Simplified deployment – Adding users to the system is as simple as defining the user in the administration module
- Easier maintenance – Any updates or upgrades are done on the server and do not require access to the desktops of each user.

*How the NICE Perform Web Applications Work*

The Nice Perform solution applications were planned and designed after extensive market research. NICE organized focus groups with our existing customers to ensure the most user-friendly, easy-to-use and efficient suite of applications. All applications were optimized to meet the unique needs of different users – agents, supervisors, quality analysts and contact center managers, as well as those employed in other units in the organization, including executives, marketing analysts and client service specialists.

Those goals were achieved in part by by using state-of-the-art graphical design and advanced Microsoft®.NET technology The different modules of NICE Perform complement each other to provide insights based on customer interactions, and comprise a powerful tool to monitor the quality and productivity of the contact center. The sections that follow examine the components of NICE Perform in more detail.

The Business Performance Portal

The NICE Perform business performance portal provides each user with a summarized, fully personalized view of the main activities of the contact center. Based on predefined privileges and personal needs, users can decide what information will be accessed using the portal and where it will be located on the screen.

The business performance portal serves as a link to other applications, enabling more personal communication between agent and supervisor, even during times of high pressure. Agents are empowered by accessing the latest available information about their performance, including evaluated calls, customer feedback and relevant reports. Through the portal, they can also access their personalized coaching packages, which can include tips from their supervisor, evaluations of their interactions, information on new campaigns and procedures, or any other information they need to stay up-to-date. In addition, users outside the contact center can readily access the information about customer interactions that interests them from a single, Web-based window.

Fig. 8A-12

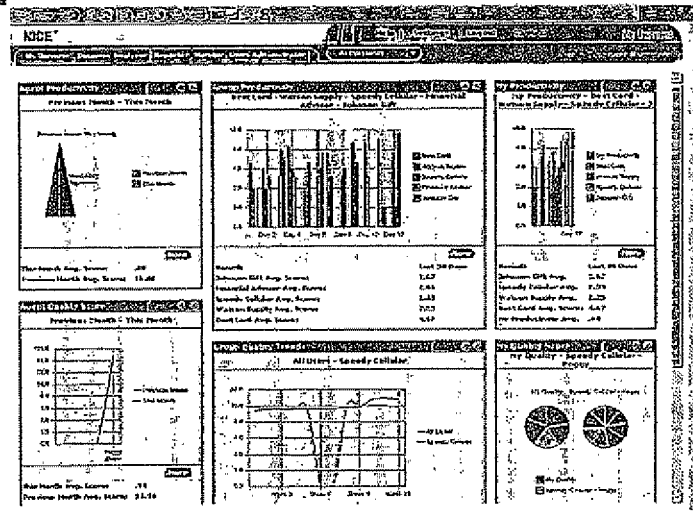

Figure 3: My Universe Window

Business Analyzer

This NICE Perform investigative tool is the main work tool for system users; it includes advanced query capabilities, quality assurance evaluations, creation of focused coaching packages and new advanced visualization features for presentation of query results.

The Business Analyzer enables users to search for all existing system elements and perform any relevant activity on the search results. With this wide range of query criteria and visualization capabilities, users can reach the root of the business issues quickly and efficiently.

The following are some of the fields that can be used for call searching:

- Audio analysis – Mentioned words and phrases, their location and certainty for each part of the call, as well as emotion level of each party on the call. Talk over analysis analyzes customer/agent bursts, number of agent bursts, number of customer bursts, talk over percentage, silence percentage, agent talk percentage and customer talk percentage.
- ScreenSense – Events, group of events, event value, event object value, position at call.
- Advanced call flow events - Queue time, hung-up side, ring time, number of holds, number of transfers, actual wrap-up period and abandon from hold.
- Customer feedback - Survey score, question score, question result and voice comment indication.
- Business data and calculations - User comments, business data inserted by user or by CTI driver, scoring calculations.

The NICE Perform business analyzer provides graphic information to help, for example, a VP Marketing who wants to improve customer retention. The following figure depicts the results of the first stage of the search performed in the system.

Fig. 8A-13

NICE

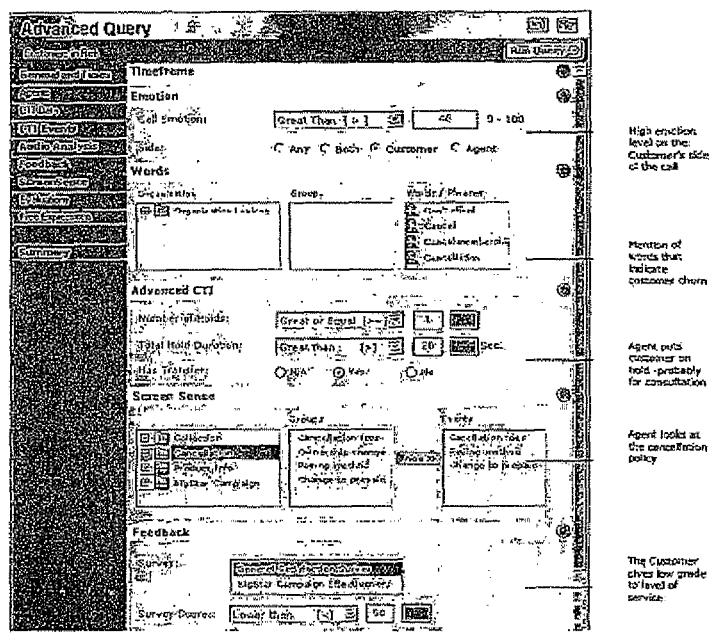

Figure 4: Advanced Query Screen in the Business Analyzer

A simple search brings together formerly disparate or unknown information and effectively pinpoints calls that indicate a high risk of customer abandonment.

The query results, as shown in Figure 5, provide a list of customers at risk of leaving. It also provides the score that the system, based on predefined rules (in this case, to assess the risk of customer abandonment) assigns to each result.

Fig. 8A-14

NICE

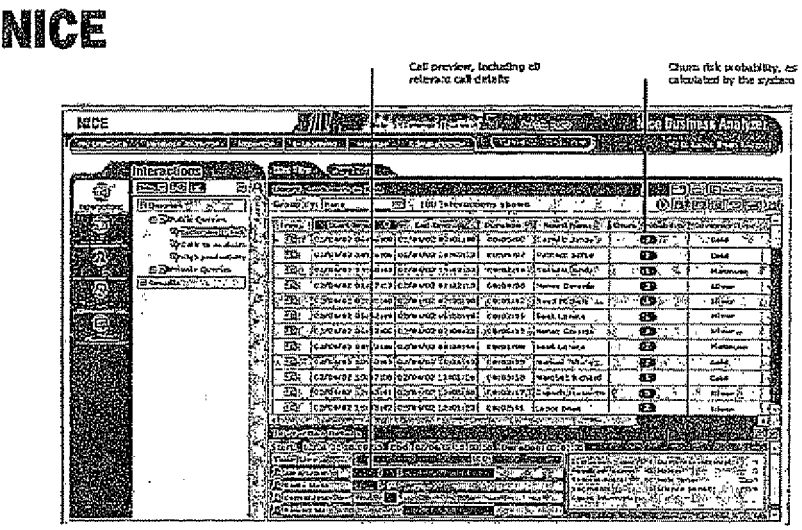

*Figure 5: Query Results in the Business Analyzer*

These same results can be displayed in various graphical representations, including a color-coded bar scheme per agent, where the length of each bar represents the length of each interaction and (in this example), the color represents the risk to customer retention.

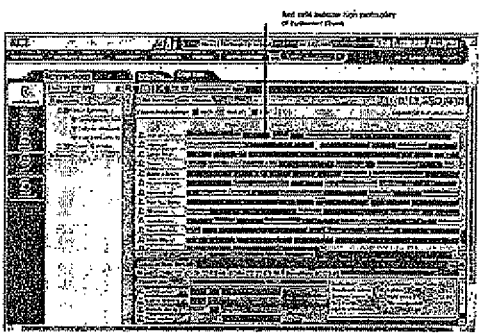

*Figure 6: Query Results Visualization - Business Analyzer*

The Business Analyzer also offers sophisticated playback of voice calls and screen activity, allowing users to examine each interaction in depth and in full. The graphic presentation of the interaction in the playback window lets users see clearly where key words appear in the conversation. By simply positioning the mouse cursor over a specific segment of the conversation, a screen tip appears with the actual word used. In addition, the emotion level of the various segments is clearly displayed. These advanced playback capabilities allow users to save time by jumping to the exact segment that is of interest to them. Yet another

Fig. 8A-15

NICE powerful feature of the Playback Application is the ability to view the full path taken by each call and the interactions between customer and agent at each step along the way.

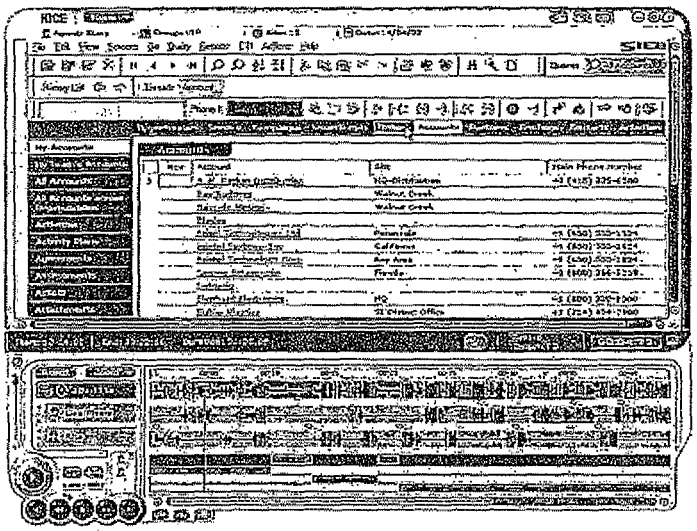

*Figure 7: Playback Application - Business Analyzer*

Furthermore, users can drill down to each interaction and evaluate it for quality management purposes. This enables users, for example, to focus exclusively on the evaluation of calls that have a longer hold time than average, those with a large number of transfers, or even those where the system detected a low probability of customer retention. Of course the advanced randomized call-picking mechanism, for a fair evaluation process, remains an integral part of the system and has even been improved in NICE Perform.

Fig. 8A-16

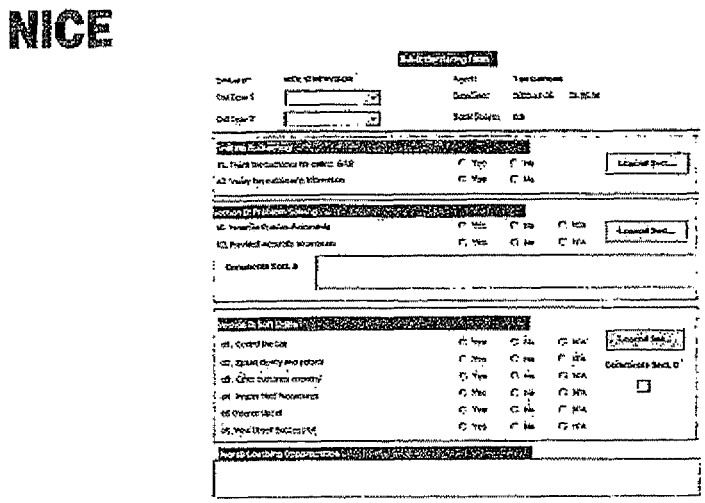

Figure 8: Sample Evaluation Form

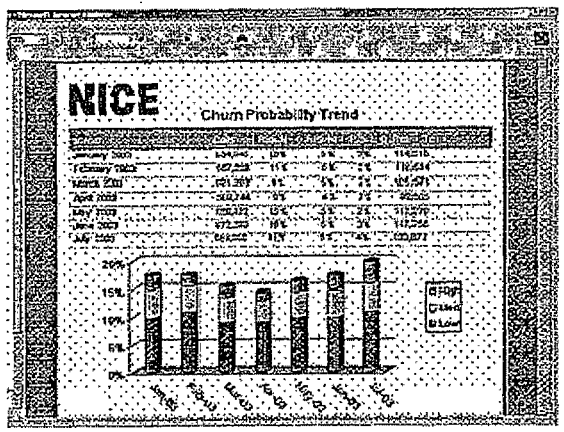

Figure 9: Retention Probability Trend Report, by Month

Moreover, fully customizable reports, in addition to a large set of predefined reports, enable this information to be sent to whoever needs it, whenever it is requested.

Coaching

NICE Perform's analytical tools provide decision makers in the enterprise with the insights they need to begin taking action immediately – from using customer feedback and

NICE redesigning a recently launched campaign, to improving product development processes and making their contact center more efficient.

One of the most important uses of agent coaching is providing supervisors with insights they can use: how to coach agents on dealing with newly discovered problems, how to show agents their performance has helped increase customer satisfaction, and what to anticipate in the upcoming campaign.

NICE Perform's new coaching capabilities enable supervisors, coaching specialists, marketing directors and other authorized experts throughout the enterprise to share knowledge by creating coaching packages that truly empower agents.

- Supervisors can use the Clip Creator to easily build and send agents coaching tips, annotated calls, evaluations and feedback on a recently evaluated interaction – while the issue is still hot.
- Coaching specialists can, in a matter of minutes, send coaching packages to demonstrate the correct use of applications or edit real calls to use them as examples of how to deal with current issues.
- The marketing team can communicate directly with agents by updating them on the newest campaign, and create and maintain strong ties between departments in the enterprise.
- Trainers can cut non-relevant segments of the call and store the remaining part for training purposes to provide insight into real "field experience".

Agents can review their coaching packages in their own time, let their supervisors know that they have reviewed them and send back comments. Furthermore they can replay the coaching packages whenever they like.

*Figure 10: Clip Recording Tool*

Reporter

While many vendors offer "Web reporting", NICE Perform offers an extremely comprehensive Web reporting application based in part on Crystal Decisions. NICE Perform Reporter is designed with enterprise reporting in mind, allowing users to incorporate multiple data sources to produce reports and visualize trending specific to their organization.

Enterprise reporting is one of the most critical components of performance management. The NICE approach to reporting is to offer a flexible, open and robust engine that accommodates multiple data sources to achieve client-specific needs. NICE Reporter also offers unmatched ease of use to allow for quick report creation and administration. The application is designed for multi-site administration and information sharing.

Fig. 8A-18

NICE

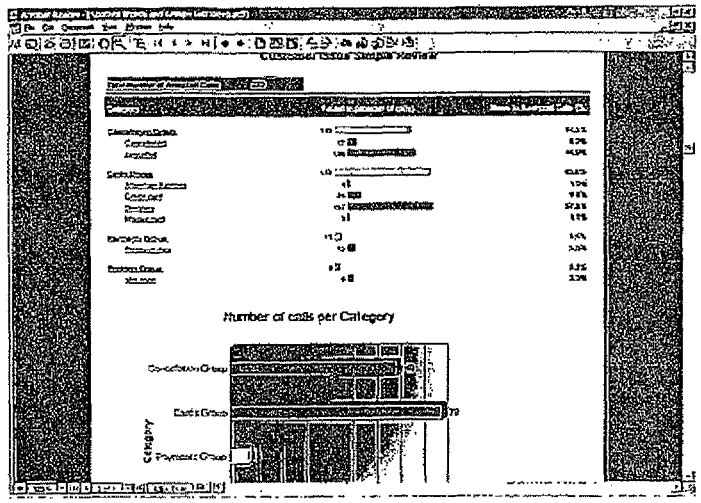

*Figure 11: Sample Call Type Report*

NICE Perform Reporter offers users a range of business benefits:

- Implement an enterprise focus to reporting, allowing the roll-up of data across multiple sites, as well as implement and monitor best practices across the entire organization.
- Automate report scheduling and distribution, and send reports in multiple formats, saving supervisors time and providing reports to executives in the manner that they prefer, including directly to their email inbox.
- Drill down from high-level reports to a listing of the interaction itself.
- Begin creating reports and graphs from day one, and quickly customize and modify the standard reports using the Crystal Decisions engine.
- Create visually dynamic reports that match the look and feel of the organization.
- With over 60 built-in reports, integrate multiple quality scores and metrics into a single report including:
  - Productivity vs. quality (PQ).
  - Quality and customer satisfaction.
  - Breakdown of interaction topics based on word spotting and emotion detection.
  - Quality and training scores.
    - Data imported from other sources to customize reports to needs using Crystal Reports.

Fig. 8A-19

NICE

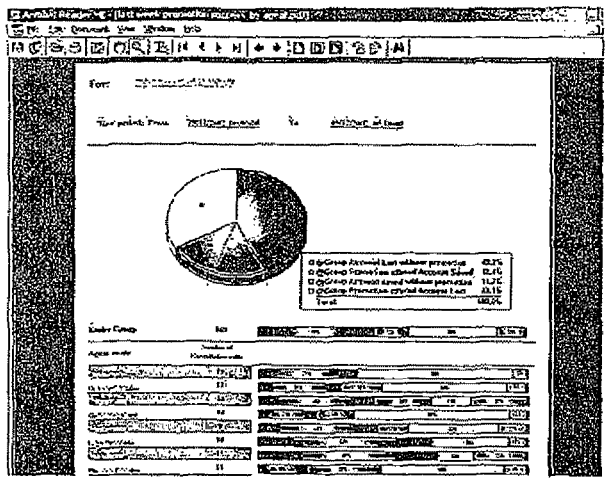

*Figure 12: Adherence to Script – Sample Report*

- Drill down to investigate root causes of trends.
- Drill down and play back specific recordings or evaluation forms directly from the report to understand the interactions behind the trends.
- Track overall quality performance based on a scorecard approach that integrates multiple quality components including:
  - Training
  - QM results
  - CTI parameters
  - Customer satisfaction
  - Schedule adherence
  - Compensation and benefits

Advanced Analysis Tools

While NICE Perform Reporter provides efficient and effective tools for quality management in many surroundings (such as contact centers), many organizations could benefit from more sophisticated reports utilizing a wider range of parameters.

NICE Perform Reporter offers users advanced OLAP-based tools that provide a rapid analysis of shared, multidimensional information. This means that different parameters (for example, customer satisfaction, waiting time and agent excitement) can be charted against each other to provide new and insights into customer relationships.

OLAP-based Reports

NICE has developed a range of data cubes that can be used by the NICE Perform OLAP reporter to create advanced, multidimensional reports covering the common business needs of the modern enterprise. These reports provide an efficient analysis of insights generated by NICE Perform. NICE's OLAP technology and advanced viewing tools generate these reports very quickly, and provide a flexible means of creating different views and adding ad-hoc changes.

Product Management  October 2004
NICE Perform  Page 16 of 24

Fig. 8A-20

NICE

NICE Consulting Services can analyze the customer's specific needs and requirements in order to design and implement, together with the customer, a range of additional data cubes for customized business views.

Data Mining

NICE also offers more advanced statistical models and tools that customers can use to create insights (rather than just view statistical relationships) from data available in their system. Using the tools and assistance available from NICE, customers can undertake sophisticated data mining of the information available in their system. Data mining, using tools such as dependencies decision trees and what-if analysis, helps customers discover more sophisticated relationships embedded in the mass of information available in the interactions data base.

For example, users can examine the three main parameters that affect customer satisfaction during a call. The data mining tool returns a list of parameters graded according to their level of influence, and then uses "what-if" analysis to understand the impact of changing one or more parameters on the level of customer satisfaction. [

Rules Manager

NICE Perform Rules Manager is a single, centralized application that allows users to define recording and call tagging rules. It further allows them to schedule recording, define audio analysis rules, build scoring formulas, define classification and define storage rules. Users can focus on different parts of the organization and define the appropriate rules for each group.

Recording and Tagging of Calls

All rules related to the scheduling of recording (including "negative recording") as well as the tagging of calls are defined in the Rules Manager application.

Fig. 8A-21

NICE

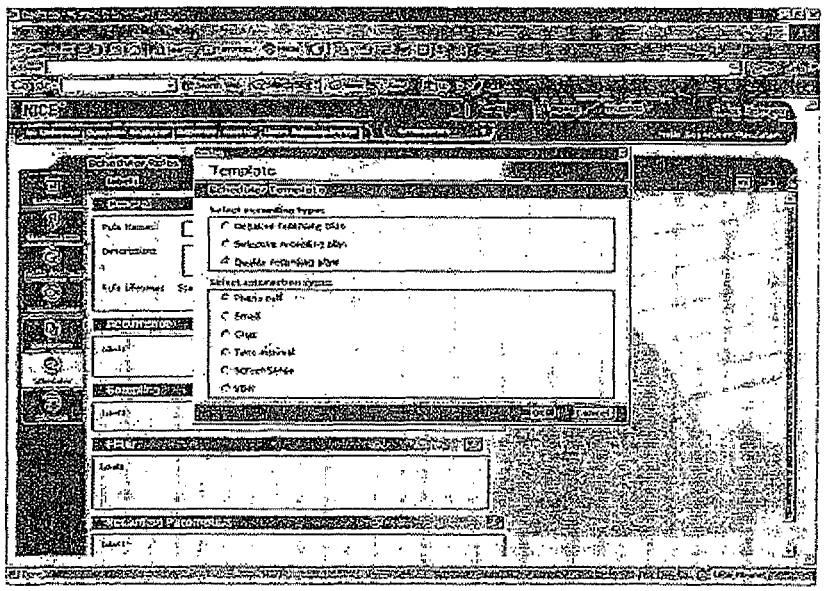

*Figure 13: Rules Scheduler*

Audio Analysis Rules

The Audio Analysis rules determine the different types of analysis performed on each call, that is, which of the recorded calls will be analyzed for word spotting, emotion analysis, talk analysis or all of these. Advanced algorithms in the rules engine also help prioritize analysis demands, so that the system continues to function smoothly.

Fig. 8A-22

Figure 14: Audio Analysis Rules

NICE Storage Center™ Rules

The NICE Storage Center in NICE Perform defines the retention and archiving rules for storage of voice and screen interactions.

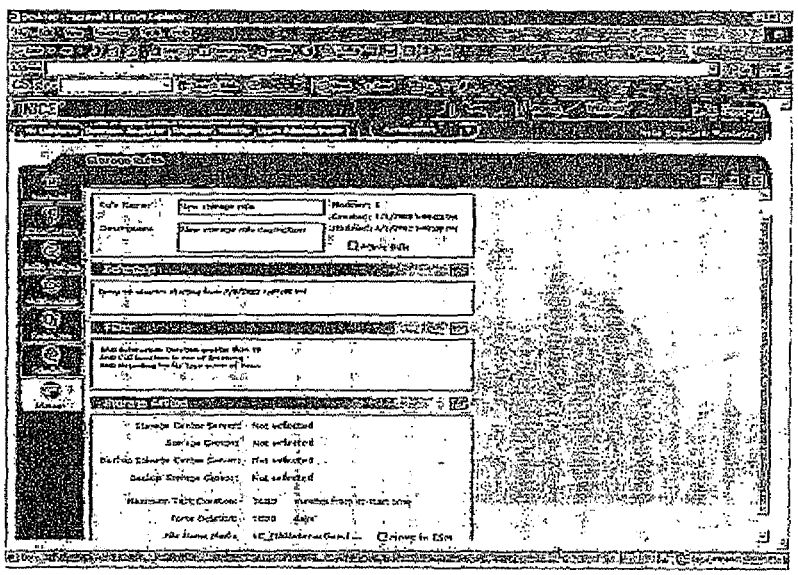

*Figure 15: Storage Rules*

Scoring and Classification Rules

These rules define the auto-scoring formulas for each interaction. Users can define an unlimited number of rules, according to their requirements. The results are stored in the database and are available for search and reports.

For example, a customer satisfaction score could be calculated by defining a rule to take call flow and audio analysis data and combine them in a formula where the number of CTI "hold" events and audio analysis emotional expressions are evaluated to create a customer satisfaction score per interaction.

It is also possible to classify calls that contain improper customer greetings. A further example would be a rule created using audio analysis word-spotting data to mark interactions that do not contain proper greeting words or phrases. Interactions not found to contain any of the words or phrases that relate to proper greeting such as "How are you?", or "How may I help you?", can be classified automatically as belonging to a "Poor Service" group. They can then be queried at a later date and retrieved by this classification.

NICE Monitor

This award-winning application enables agents, supervisors and other authorized users to perform live monitoring of agents. It also enables users to stop and start recording-on-demand, block recording, set business data fields and more.

Fig. 8A-24

NICE

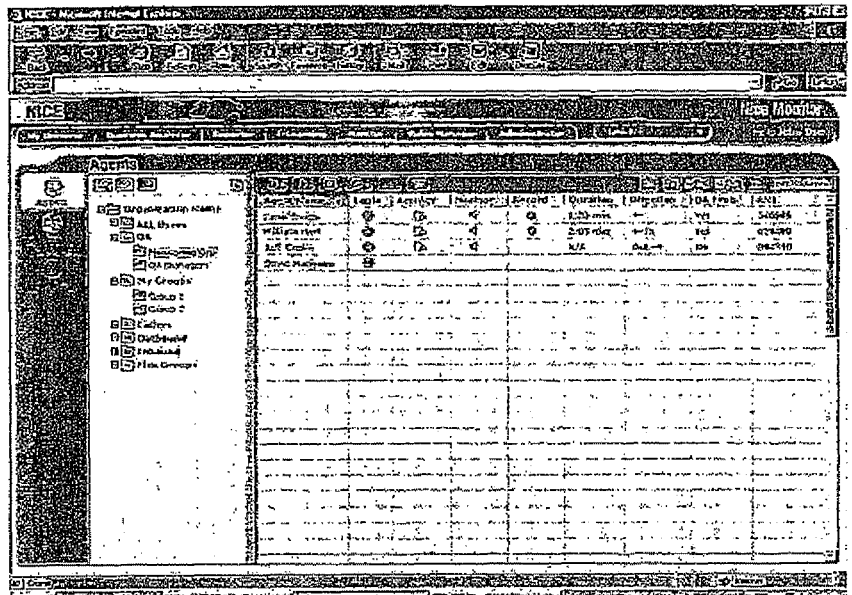

*Figure 16: NICE Monitor*

Administrative Tools

NICE Perform includes a variety of administrative tools designed to manage the system as efficiently as possible.

Survey Manager

Using the NICE Perform Survey Manager, users can create and manage surveys to be used in the NICE Perform Feedback application.

User Administrator

The NICE Perform User Administrator is a collection of tasks that enable the system to reflect the customer-specific environment and requirements.

Organizational groups can be created to allow the administrator to easily define an organizational hierarchy that reflects the organization al structure, including nested groups. Groups can also contain application users and agents. The privileges and profiles mechanism was designed to meet the requirements of organizations with complex structures, including multinationals or outsourcing bureaus.

Fig. 8A-25

NICE

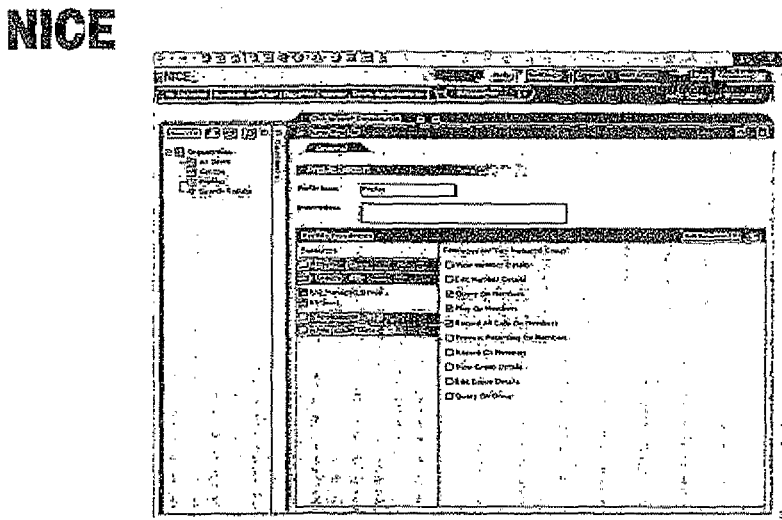

Figure 17: User Administrator Tool

System Administration
This application is an easy-to-use, single point of administration for all system servers and components, including the voice and screen recorders, the Interaction Center, Application Center and Audio Analysis Capture unit, the NICE Storage Center and more. The management of multiple sites is supported.

Lexicon Manager
This NICE Perform application enables users to create and organize hierarchies of groups of words and phrases to be used for word spotting processing. These hierarchies can be accessed and used from applications that use functionality related to audio analysis.

Fig. 8A-26

NICE
Afterword

Only the range of information sources available in NICE Perform, together with this new solution's ease of use, visualization and distribution features can deliver the insights from interactions and powerful results that every service organization can immediately put to use.

Maximum performance, creating and using insights developed from interactions is now at your fingertips. Imagine how far you could go with NICE Perform if you could leverage it today.

Fig. 8A-28

NICE Perform™

Solution Brief

NICE

Disclaimer
Information in this document is subject to change without notice and does not represent a commitment on the part of NICE Systems Ltd. The systems described in this document are furnished under a license agreement or nondisclosure agreement.
All information included in this document, such as text, graphics, photos, logos and images, is the exclusive property of NICE Systems Ltd. and protected by United States and International Copyright laws.
Permission is granted to view and photocopy (or print) materials from this document for personal, non-commercial use only. Any other copying, distribution, retransmission or modification of the information in this document, whether in electronic or hard copy form, without the express prior written permission of NICE Systems Ltd., is strictly prohibited. In the event of any permitted copying, redistribution or publication of copyrighted material, no changes in or deletion of author attribution, trademark legend or copyright notice shall be made.
360° View, Agent@home, Executive Connect, Executive Insight*, Experience Your Customer, Investigator, Lasting Loyalty, Listen Learn Lead, MEGACORDER, Mirra, My Universe, NICE, NiceAdvantage, NICE Analyzer, NiceCall, NiceCLS, NiceCMS, NICE Feedback, NiceFix, NiceGuard, NICE Learning, NICE Link, NiceLog, NICE Perform, NICE Playback Organizer, Renaissance, ScreenSense, NICE Perform, NiceScreen, NiceSoft, NICE Storage Center, NiceTrack, NiceUniverse, NiceUniverse LIVE, NiceVision, NiceVision Harmony, NiceVision Mobile, NiceVision Pro, NiceVision Virtual, NiceWatch Renaissance, Secure Your Vision, Tienna, Wordnet and other product names and services mentioned herein are trademarks and registered trademarks of NICE systems Ltd. All other registered and unregistered trademarks are the property of their respective owners.
* For Australia only.

Product Management                                          April 2005

All contents of this document are: Copyright © 2004 NICE Systems Ltd. All rights reserved.

Fig. 9B

NICE

Table of Contents

Abstract .................................................................................. 1
Overview: The Service-Provision Challenge ........................... 2
Insight from Interactions ..................................................... 3
   Coaching and Quality Management ................................................ 3
   Who Benefits? .............................................................................. 3
NICE Perform Tools .............................................................. 5
   Capturing Audio and Screens ....................................................... 5
   The Audio Analysis Engine ........................................................... 6
   Call Flow Events ......................................................................... 6
   Agent Screen Activity .................................................................. 6
   Customer Surveys ...................................................................... 7
NICE Perform Architecture ................................................... 8
   The Applications Layer ................................................................ 8
   The Engines Layer ...................................................................... 8
   The Capture Layer ...................................................................... 8
   Database and Storage Services .................................................... 9
Summary ............................................................................ 10

Fig. 9C

NICE

Table of Figures

Figure 1: NICE Business Analyzer .................................................................. 5
Figure 2: Searching for Calls with an Advanced Query ................................. 6

Product Management     April 2005
NICE Perform

Fig. 9D

NICE

Abstract

In an era where the boundaries between product, promotion, price and placement are blurred, and customer loyalty remains the only true differentiator, the challenges of service-providing organizations are further compounded. Companies dedicate valuable effort to searching for a convenient, reliable and timely method of obtaining insights about internal processes, customers and the competitive environment. Despite the investment in time and money, these efforts often lack focus and coordination. Worse still, they are often not very successful.

Paradoxically, the information is there—but the wealth of data available in customer interactions remains almost entirely untapped.

More and more of today's business is characterized by increasing reliance upon interactions conducted via telephony and web-based communications. These means of communication are becoming an important and strategic dimension of business across a broad spectrum of vertical markets. In these business environments, a great deal of information lies hidden within the ever-growing quantities of unstructured multimedia interactions. This information can provide decision makers in a variety of areas throughout the enterprise with powerful insights into their marketplace and customer base, and direct access to key business scenarios. Many of these capabilities are not available with traditional transactional-based analytics tools. They are of great value to organizations constantly searching for better ways to understand their market dynamics and customer intent, while operating within the limitations of traditional surveying and data analysis techniques and growing regulatory requirements.

NICE Perform provides the breakthrough. By analyzing interactions across an unprecedented range of parameters, NICE Perform extracts the insights that answer those questions previously considered unanswerable – across a range of vertical markets. While providing critical statistical data, NICE Perform offers a solution that goes beyond the scope of transactional analytics to help decision makers understand customer intent and market dynamics, identify current and future trends early enough for proactive management of challenges, opportunities and changes, and enhance corporate governance throughout the enterprise.

NICE Perform offers organizations a powerful tool for improving customer retention and solving many other business issues. The system's ability to analyze all aspects of interactions means that it can effectively flag calls from customers "at risk", help in analyzing campaigns effectiveness, identify inefficiencies in the Contact Center operation and much more. NICE Perform lets the organization take proactive measures to improve the overall performance.

NICE believes that organizations should dedicate their efforts to their core activities. That's why NICE Perform is designed to simplify and enhance operations. With a sophisticated, yet, easy to use solution, NICE Perform gets the right information to the right people in the organization at the right time, to be used for overall business management improvement.

That's insight from interactions.

Fig. 9E

NICE

Overview: The Service-Provision Challenge

In today's world, every organization is a service-providing organization. True, specific groups in the organization, such as sales, customer support and the contact center, are dedicated to serving customers, but the problems and achievements of its service-oriented units significantly impact the general outcome of each and every company process, from production to revenue collection, and from product design to marketing strategy.

The service-providing organization is dynamic and must be able to respond quickly to changes in its environment. In an era where the boundaries between product, promotion, price and placement are blurred, and customer loyalty remains the only true differentiator, the challenges of service-providing organizations are further compounded.

Some of the most recognizable challenges include:

- Improving customer retention – The cost of acquiring a new customer is several times higher than the cost of keeping an existing one. Therefore, low customer retention rates inevitably translate into low growth and high costs, not just for the contact center, which must process orders, but also for every single item on the balance sheet.
- Ensuring high quality at lower cost - This is common to all organizations, and the quest to lower costs while maintaining high levels of service is more crucial than ever. Companies must find ways to effectively implement quality assurance across the enterprise, especially in customer-facing operations.
- Finding a differentiator – What gives you competitive advantage? Certainly not traditional differentiators such as unprecedented speed, campaigns that can be copied, price wars, a product that can be imitated and slogans changed. Service, which is directly linked to customer loyalty, is the only remaining differentiator.
- Eliminating data overload and poor business intelligence –Resources spent on data collection are not always invested in the areas where they're needed the most. To obtain true business intelligence, companies need not only to gain access to the wealth of data potentially available, but also to be able to distinguish relevant data from unimportant material. Companies further need the ability to analyze it so that it facilitates the decision-making process.
- Neutralizing competitive threats – Dynamic organizations must keep on top of their changing competitive environment. One of the biggest challenges is trying to anticipate the tactics competitors may use to lure away their customers.
- Working as a global company – Today's business world knows no geographic boundaries, and different branches of the same organization, regardless of the physical location and possible time differences, must be able to work as one. It is imperative, therefore, to implement solutions that are fully capable of supporting multi-site systems and provide all users with real-time access to company systems, no matter where they are located.
- Providing employee training and recognition – This is particularly true for contact center agents, who, despite their low rank in the company hierarchy, deal with the most valuable of its assets: customers. Agents need to be kept up-to-date about the company's campaigns and policies, receive constant feedback on their performance, and ensure they are empowered to complete their job in the best possible way.
- Measuring campaign effectiveness – Companies spend substantial resources on collecting data from customers to evaluate the effect of a new product offering, price reduction or advertisement. However, most of the time, these evaluations are costly and do not provide immediate feedback.

Fig. 9F

NICE

Insight from Interactions

Companies dedicate valuable effort to searching for a convenient, reliable and timely method of obtaining information about internal processes, customers and the competitive environment. Despite the investment in time and money, these efforts often lack focus and coordination. Worse still, they are often not very successful.

Paradoxically, the information is there—but like a hidden goldmine, the wealth of data available in customer interactions remains almost entirely untapped.

Recorded customer interactions are far more than a way to comply with regulatory or liability guidelines or provide feedback to customer service representatives. With the right tools, companies can locate, extract, refine and distribute a wealth of information from their existing resources.

NICE Perform gives companies the tools to do what was previously impossible – to create insight from interactions. NICE Perform technology means lower storage costs, a much more cost effective interaction-capturing platform and retention rules ensuring that all organizations, even those that do not have to record for liability or regulation, can benefit from recording all of the interactions without requiring major investment.

NCE Perform provides efficient ways to extract the information, analyze it and visualize it in a graphically effective manner, so that all units in the organization can use it to create insights and improve overall business performance.

*Coaching and Quality Management*

Ensuring employee satisfaction is vital for maintaining satisfied customers. Nice Perform seamlessly integrates e-Learning with Quality Management so that contact centers can provide continuous feedback to their agents. NICE's coaching module provides tools for creating coaching packages and sending them directly to the agent's desktop. Agents use NICE Perform's customized portal to view their progress, compare their performance, and play back calls. These powerful capabilities lead to effective communication and agent recognition -- two essential elements for increasing employee satisfaction and reducing agent attrition.

*Who Benefits?*

The wealth of insights obtainable from customer interactions serves far more than the contact center supervisor – it is a timely, reliable, invaluable and inexpensive source of business intelligence for the entire organization. Among other possibilities:

- Executives can now effectively measure customer retention rates and understand the true reasons behind them.
- Legal departments can receive rapid warnings of possible legal problems from analysis of customer interactions.
- Marketing directors can receive timely and reliable information on , for example, the effectiveness of a TV campaign launched only a few hours earlier.
- Contact center managers can analyze feedback to gauge and improve first-call resolution.
- Account managers can locate all the interactions belonging to a specific account, analyze problematic areas and identify major issues.
- Quality supervisors can analyze customer responses to verify that supervisors' agent evaluations reflect customer perceptions.

Fig. 9G

NICE

- Supervisors can evaluate agent interactions, from anywhere, to ensure that the required level of quality is maintained and that organization policies are followed.
- Agents can access their own evaluations, quality reports, coaching packages and any other important information about their performance from a single point, based on the privileges they have been granted. This ensures that they receive and provide ongoing feedback, and empowers them to perform better.
- Coaching specialists can quickly create and send a focused coaching package to an agent, a group of agents or the entire contact center.
- Contact center analysts can define autoscoring formula to assist users in evaluating calls or identifying those that show a specific trend.

In short, all units in the enterprise can benefit from the insights NICE Perform generates from interactions.

Product Management  April 2005
NICE Perform  Page 4 of 10

Fig. 9H

NICE

NICE Perform Tools

NICE Perform includes a complete set of Web-based tools to extract, process, analyze and effectively visualize information from customer interactions on a large scale. The information gathered through:

- Sophisticated mining rules
- Analysis engines
- Call flow events,
- Agent screen-activity
- Customer surveys Together, these resources provide the insights which until now have been unavailable from recorded interactions.

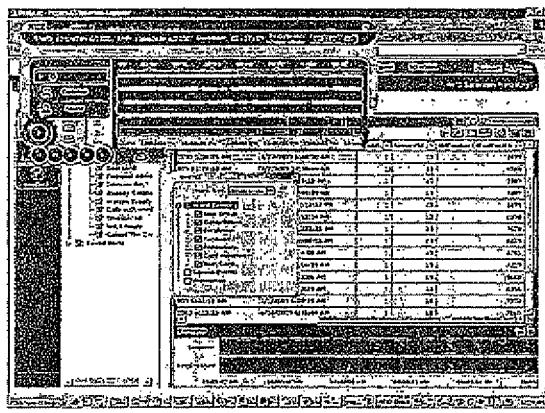

*Figure 1: NICE Business Analyzer*

When combined, these five major tools deliver unmatched ability to extract insights fro customer interactions and to use these insights to promote business success.

Capturing Audio and Screens

With up to 500 channels per recorder, high compression rates and the ability to integrate with any storage system, the NiceLog® Logger in NICE Perform provides a robust method of capturing the complete breadth of customer interactions in the contact center through fixed or random-based scheduling, event-based recording or recording of all calls. Furthermore, sophisticated rules allow the system to "listen" to calls – and keep only those the organization finds valuable.

With this advanced capturing solution from NICE, there is no longer any need to compromise by recording only a sample of the interactions with customers. For the same cost, the company can now capture all interactions (including voice and screen), have the system analyze them and, based on predefined rules, store only what is necessary. This sophisticated analysis of all calls and accessibility to any of them dramatically improves the

Fig. 9I

NICE quality management process in the call center, and the response to intelligence gathering needs.

*The Audio Analysis Engine*

NICE Perform utilizes technologies such as automatic speech recognition, word spotting, and stress/emotion analysis to enable users to extract strategic business intelligence from customer interactions.

- Word spotting – Automatically searches for predefined words and phrases, and enables a manual search for additional words and phrases if required. Word spotting lets users locate critical words, identify competition, detect customer intentions, monitor agent compliance with policies, and evaluate effectiveness of campaigns and sales programs.
- Emotion detection – Understand the context of the conversation; spot stress-related calls from either the customer or agent, and identify what is behind the emotions.
- Talk analysis – Pinpoints periods of silence and overlaps between the agent's voice and the customer's voice, as well as the percentage of the call dominated by either party in the interaction.

*Call Flow Events*

With NICE Perform, organizations can receive and analyze a large number of parameters from the traditional or IP telephony infrastructure, including hold time, talk time, queue time, wrap-up time, abandon from hold and more, and then link all of them to the actual call and context of the call.

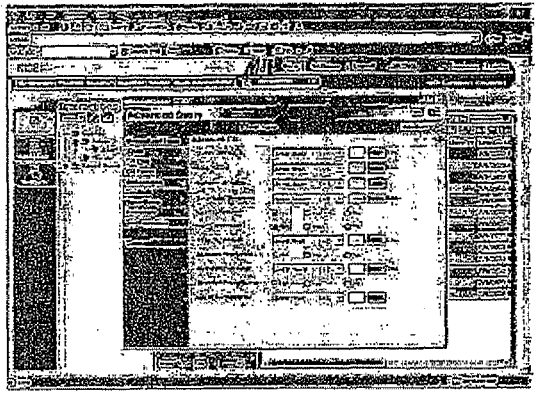

Figure 2: Searching for Calls with an Advanced Query

*Agent Screen Activity*

ScreenSense™ is an innovative, no-integration application that allows NICE Perform users to capture or tag any type of interaction (voice, VoIP, chat, email, co-browsing) based on agent screen activity or any type of information that appears on the screen (such as customer name, segmentation, monthly bill). It is fully interoperable with virtually any homegrown or third-party application (CRM, ERP, e-Learning, e-mail/Chat, Help-Desk

Fig. 9J

NICE applications and more). In addition, ScreenSense is platform independent and supports both Web-based applications and traditional client-server applications.

ScreenSense also has the power to extract any item of information from the agent's screen and store it as part of the interaction metadata field. Without integration with the application itself, organizations will be able to attach, for example, the customer name, monthly bill amount, customer classification or any other item of information from the agent's screen to the interaction data for future query or reporting needs.

The identified screen event is displayed as a tag during the playback of the call, allowing reviewers to jump to the precise moment in the interaction that the event took place.

Customer Surveys

NICE Feedback™ is a fully integrated, IVR-based survey solution which makes gathering of customer feedback easy and cost-effective. This post-call IVR survey is designed to obtain reliable information on the interaction from the first-hand source: the customer.

NICE Feedback helps companies to obtain timely responses from customers and compare these responses to quality monitoring scores or any other detail from the system, giving them a full picture of the customer interaction. These same surveys can also be used to collect customer feedback on products or marketing campaigns.

It also allows companies to take the advantage of the enormous number of customers that call their contact center every day (at a time that is most convenient for the caller), and asks them to stay on the line for a few more seconds to provide their feedback.

The dedicated reports in the NICE Reporter application enable automatic generation and distribution of results to anyone who needs this information. NICE effectively integrates all of these capturing, analysis and visualization tools inside NICE Perform. As a result, companies maximize the output of intelligence derived from different sources of data, saving valuable time and money, and reaching levels of insight that were not previously possible.

Fig. 9K

NICE

NICE Perform Architecture

NICE Perform offers a robust yet simple-to-manage and highly flexible architecture based on industry standards. NICE Perform architecture offers an infrastructure that is reliable enough to eliminate downtime, and scalable enough to support fast growth in a demanding business environment. The architecture offers heightened flexibility in terms of add-on applications and can be used in a wide range of environments.

NICE Perform architecture is comprised of the following main layers:

- Applications Layer: Application Services that enable comprehensive business insight with rich user experience.
- Engines Layer: Engine process layer that transfer interaction into business knowledge.
- Capture Layer: Capture of multi-media business interaction.

In addition, the architecture includes:

- Database Services: A comprehensive database services for interaction related data including data mining and OLAP capabilities.
- Storage Services: Smart archiving services utilizing leading industry storage technologies.

The Applications Layer

The applications layer is based on Microsoft .NET framework utilizing .NET advanced capabilities for high performance, security and rich user experience. The application layer communicates with the Engines layer to provide the user with a Web based management interface and advanced capabilities such as monitoring, reporting, Business Analysis utilities and more.

This layer contains the NICE application suite, which includes NiceUniverse®, NICE Feedback™, ScreenSense™, NICE Coaching and more. More detailed information can be found in other NICE V9 documentation.

The Engines Layer

The engines layer resides on top of the Capture layer and interfaces with the Application layer. The engines layer receives its input from a variety of resources such as:

- Business rules defined by the user.
- CTI events.
- Storage rules.
- External information via API.
- Database services

The Capture Layer

NICE's capturing platform offers flexible architecture that helps companies react quickly to new market challenges.

NICE's capturing platforms run on Microsoft® Windows® operating systems, offering a variety of capturing methods to meet different needs.

Fig. 9L

NICE

The capture layer receives inputs from multiple sources including:

- PBX, using different capturing methods such as Extension/Trunk side, dedicated link or VoIP.
- User's screen
- Chat and emails
- Screen events and user's input
- CRM entries
- DTMF events

Database and Storage Services

The database and the storage services provide comprehensive services for the capturing and the engines layers. NICE flexible and scalable architecture enables both the storage and database services to reside locally or remotely, serve one or more environment and scale rapidly as business needs dictates.

Fig. 9M

NICE

Summary

Only the range of information sources available in NICE Perform, together with this new solution's ease of use, visualization and distribution features can deliver the insights from interactions and powerful results that every service organization can immediately put to use.

Maximum performance, creating and using insights developed from interactions is now at your fingertips. Imagine how far you could go with NICE Perform if you could leverage it today.

Fig. 9N

METHOD AND SYSTEM FOR SECURE DATA COLLECTION AND DISTRIBUTION

CROSS-REFERENCE TO RELATED APPLICATIONS

This application is a continuation application of U.S. patent application Ser. No. 11/519,971, filed Sep. 13, 2006, entitled "METHOD AND SYSTEM FOR SECURE DATA COLLECTION AND DISTRIBUTION", which is incorporated in its entirety herein by reference.

FIELD AND BACKGROUND OF THE INVENTION

The present invention relates to a method and system for collecting data at a source and distributing the data to one or more destinations and, more particularly, to such a method and system in which the data are protected from eavesdropping and from unauthorized changes from when the data leave the source until the data arrive at their ultimate destination(s).

The efficient storage and retrieval of multi-channel data communications, and especially of voice data, are critically important in many modern business and government applications. For example, financial institutions record instructions from clients as a protection against fraud and as evidence in legal proceedings about the content of telephone conversations; public safety agencies record emergency calls for event reconstruction and future investigations; commercial entities monitor transactions over the phone to evaluate salespersons' efficiency, to ensure customer satisfaction and to develop training programs.

Data logging and retrieval systems for capturing, recording and retrieving data transmitted over multiple communication lines are known in the art. See for example Henits, U.S. Pat. No. 6,775,372, which patent is incorporated by reference for all purposes as if fully set forth herein, and the references cited therein. FIG. 1 is a high-level schematic block diagram of an exemplary prior art system 10 for capturing, storing and retrieving telephone conversations. System 10 is based on a Local Area Network (LAN) 12 that uses the IP protocol to transfer digital data, borne by IP packets, among the other components of system 10. System 10 includes several loggers 14, as described for example in the Henits patent, for capturing digital data that represent telephone conversations. Digital records of the telephone conversations are stored in an archive 18. A controller 16 manages LAN 12.

LAN 12 is connected to the outside world, specifically to a Wide Area Network (WAN) 22 such as the worldwide Internet, by a Web server 20. User terminals 24, represented as personal computers, also are connected to WAN 22. A user of a terminal 24 uses a standard Web browser to access data stored in archive 18 via Web server 20.

System 10 is vulnerable to eavesdropping. Even if, as is usually the case, data captured by loggers 14 is encrypted and is stored in an encrypted form in archive 14, Web server 20 typically decrypts data requested by a user of a terminal 24 before exporting the data to WAN 22. There are many ways in which eavesdroppers can intercept the data on WAN 22, especially if WAN 22 is the worldwide Internet.

System 10 also is vulnerable to unauthorized modification of the data. This is true even if access to data in archive 18 were to be limited to terminals connected to LAN 12. For example, if archive 14 is responsible for encryption, data can be tampered with in transit from loggers 14 to archive 18.

There is thus a widely recognized need for, and it would be highly advantageous to have, a data collection and distribution system in which the data are continuously protected from eavesdropping and unauthorized modification, from when the data leave their original source until the data arrive at their ultimate destination.

SUMMARY OF THE INVENTION

The present invention defends data against eavesdropping by encrypting the data as soon as the data are collected or generated and then keeping the data encrypted at all times until the data actually are displayed to an authorized user.

According to the present invention there is provided a method of distributing data, including the steps of (a) encrypting the data, using a data encryption key, thereby providing encrypted data; (b) requesting the data, by a data requestor; (c) in response to the request, sending the encrypted data to the data requestor; (d) authenticating the data requestor, by a crypto information server; and (e) contingent on the authenticating, sending the data encryption key to the data requestor, by the crypto information server.

According to the present invention there is provided a system for secure distribution of data, including: (a) a data requestor; (b) a data provider operative: (i) to encrypt the data using a data encryption key, thereby providing encrypted data, and (ii) to send the encrypted data to the data requestor; and (c) a crypto information server operative: (i) to authenticate the data requestor, and (ii) contingent on the authentication, to send the data encryption key to the data requestor.

According to the present invention there is provided a method of collecting and distributing a plurality of instances of data, including the steps of: (a) for each instance: (i) generating a respective data encryption key, and (ii) encrypting the each instance, using the respective data encryption key, thereby providing respective encrypted data; (b) requesting at least a portion of one of the instances, by a data requestor; and (c) in response to the request, sending a corresponding portion of the respective encrypted data of the one instance to the data requestor.

According to the present invention there is provided a system for secure collection and distribution of a plurality of instances of data, including: (a) a set, of at least one data provider, operative: (i) to capture the instances, and (ii) for each instance: (A) to generate a respective data encryption key, and (B) to encrypt the each instance, using the respective data encryption key, thereby providing respective encrypted data; (b) a data requestor operative: (i) to request at least a portion of one of the instances; and (c) an archive operative: (i) to store the encrypted data; and (ii) in response to the request of the at least portion of the one instance by the data requestor: to send a corresponding portion of the respective encrypted data of the one instance to the data requestor.

The first method of the present invention is a method of distributing data such as voice data, voice over IP (VoIP) data, video data and screen data, among others. According to the basic embodiment of the first method, the data are encrypted, using a data encryption key, to provide encrypted data. When a data requestor requests the data, the encrypted data are sent to the data requestor. A crypto information server authenticates the data requestor. Contingent on the authenticating, i.e., if the crypto information server determines that the data requestor is authorized to receive the data, the crypto information server sends the data encryption key to the data requestor. Preferably, the data encryption key is a symmetric key, to enable the data requestor to decrypt the encrypted data. In the preferred embodiments below, user terminals 34 and 112 are the data requestors.

Preferably, the data encryption key is sent to the data requestor in encrypted form.

Preferably, the data requestor requests the data encryption key, and the authentication of the data requestor is in response to that request.

Preferably, the method includes generating the data encryption key and associating the data encryption key with a respective identifier. Most preferably, the data encryption keys are generated according to a predefined key granularity.

More preferably, the identifier is sent to the data requestor along with the encrypted data; and the data requestor sends the identifier to the crypto information server to request the data encryption key. The authentication of the data requestor is in response to receipt of the identifier from the data requestor by the crypto information server.

Also more preferably, the crypto information server stores the data encryption key and the identifier in a database. Most preferably, the data encryption key is stored in the database in encrypted form, to prevent unauthorized access of the data encryption key.

Preferably, the data are encrypted by a data provider, and the encrypted data also are stored in an archive that is separate from the data provider. When the data requestor requests the data, the encrypted data are sent to the data requestor from the archive. In the preferred embodiments below, loggers 32 are the data providers.

Preferably, a message authentication code is attached to the data prior to encrypting the data, so that the message authentication code becomes part of the data and is encrypted along with the data. The attaching of the message authentication code to the data may be, for example, by appending the message authentication code to the data, by prepending the message authentication code to the data or by inserting the message authentication code in the data. Contingent on the authenticating, the crypto information server sends a message authentication code key of the message authentication code to the data requestor.

More preferably, the method includes the steps of generating the data encryption key and the message authentication code key and associating the data encryption key and the message authentication code key with a common respective identifier. The identifier is sent to the data requestor along with the encrypted data; and the data requestor sends the identifier to the crypto information server to request the data encryption key and the message authentication code key. The authentication of the data requestor is in response to receipt of the identifier from the data requestor by the crypto information server. Most preferably, the data encryption key and the message authentication code key are generated according to a predefined key granularity.

Also more preferably, the crypto information server stores the data encryption key, the message authentication code key and the identifier in a database. Most preferably, the data encryption key and the message authentication code key are stored in the database in encrypted form, to prevent unauthorized access of the data encryption key and the message authentication code key.

A first basic system of the present invention, for secure distribution of data, includes a data requestor, a data provider and a crypto information server. The data provider encrypts the data using a data encryption key, thereby providing encrypted data, and sends the encrypted data to the data requestor. The crypto information server authenticates the data requestor. Contingent on that authentication, i.e., if the crypto information server determines that the data requestor is authorized to receive the data, the crypto information server sends the data encryption key to the data requestor. Preferably, the crypto information server sends the data encryption key to the data requestor in encrypted form.

Preferably, the data provider also generates the data encryption key and associates the data encryption key with a respective identifier. Most preferably, the data provider generates the data encryption key according to a predefined key granularity. More preferably, the data provider also sends the identifier to the data requestor along with the encrypted data and also sends the data encryption key to the crypto information server along with the identifier. The data requestor requests the data encryption key from the crypto information server by sending the identifier to the crypto information server. The authentication of the data requestor by the crypto information server then is in response to receipt of the identifier from the data requestor by the crypto information server.

Most preferably, both the data provider and the data requestor include respective instances of a crypto information client that is operative to generate the data encryption key and its respective identifier, to send the data encryption key and its identifier to the crypto information server, and to request the data encryption key from the crypto information server by sending the identifier to the crypto information server.

Even more preferably, the system also includes a database wherein the crypto information server stores the data encryption key and the identifier. Most preferably, the data encryption key is stored in the database in encrypted form.

Preferably, the system also includes an archive, separate from the data provider, for storing the encrypted data. The sending of the encrypted data from the data provider to the data requestor may be either direct or via the archive: most preferably, the archive is operative to send the encrypted data to the data requestor.

Preferably, the data provider also attaches a message authentication code to the data prior to encrypting the data, and, contingent on the authenticating, the crypto information server sends a message authentication code key to the data requestor.

More preferably, the data provider also generates the data encryption key and the message authentication code key, and associates the data encryption key and the message authentication code key with a common respective identifier. Even more preferably, the data provider also sends the identifier to the data requestor along with the encrypted data and also sends the data encryption key and the message authentication code key to the crypto information server along with the identifier. The data requestor requests the data encryption key and the message authentication code key from the crypto information server by sending the identifier to the crypto information server. The authentication of the data requestor by the crypto information server then is in response to receipt of the identifier from the data requestor by the crypto information server. Most preferably, the data provider generates the data encryption key and the message authentication code key according to a predefined key granularity.

Most preferably, both the data provider and the data requestor include respective instances of a crypto information client that is operative to generate the data encryption key, the message authentication code key and their respective common identifier, to send the data encryption key, the message authentication code key and their identifier to the crypto information server, and to request the data encryption key and the message authentication code key from the crypto information server by sending the identifier to the crypto information server.

Even more preferably, the system also includes a database wherein the crypto information server stores the data encryption key, the message authentication code key and the identifier. Most preferably, the data encryption key and the message authentication code key are stored in the database in encrypted form.

A second method of the present invention is a method of collecting and distributing a plurality of instances of data What constitutes an "instance" of data is implementation dependent. For example, in the first preferred embodiment discussed below, the data instances are files of audio data, and in the second preferred embodiment discussed below, the data instances are all the data captured in different external channels and all the data captured as a result of different initializations of screen agents 118. According to the basic embodiment of the second method, for each data instance, a corresponding respective data encryption key is generated and the data instance is encrypted using that data encryption key, thereby providing respective encrypted data. When a data requestor requests at least a portion of one of the data instances, a corresponding portion of the requested data instance's respective encrypted data is sent to the data requestor.

Preferably, the requested data instance includes voice data, VoIP data, video data and/or screen capture data.

Preferably, the data encryption keys are symmetric keys, to enable the data requestor to decrypt the encrypted data.

Preferably, the data encryption keys are generated according to a predefined key granularity.

Preferably, each data instance is captured by a respective data provider that then generates the respective data encryption key and uses that data encryption key to encrypt the data instance.

Most preferably, the respective encrypted data of each data instance are stored in an archive separate from the data provider that captured the data instance. Encrypted data are sent to the data requestor from the archive rather than from the data provider that captured the corresponding data instance.

Preferably, the data requestor is authenticated by a crypto information server. Contingent on the authenticating, i.e., if the crypto information server determines that the data requestor is authorized to receive the data, the crypto information server sends the respective data encryption key of the requested data instance portion to the data requestor, most preferably in encrypted form. More preferably, the authenticating is in response to the data requestor requesting the respective data encryption key of the requested data instance portion. Most preferably, each data encryption key is associated with a respective identifier that is sent to the data requestor along with the requested data instance portion, and the data requestor requests the respective data encryption key of the requested data instance portion by sending the associated identifier to the crypto information server. Also even more preferably, the crypto information server stores the data encryption keys and the identifiers in a database, most preferably in encrypted form.

Preferably, a respective message authentication code is attached to each data instance prior to encrypting the data instance, so that the message authentication code becomes part of the data instance and is encrypted along with the data instance. More preferably, a respective message authentication code key is generated and is used to generate the respective message authentication code. Most preferably, the message authentication code keys are generated according to a predefined key granularity. The attaching of the message authentication code to the data instance may be, for example, by appending the message authentication code to the data instance, by prepending the message authentication code to the data instance or by inserting the message authentication code in the data instance. The data requestor is authenticated by a crypto information server. Contingent on the authenticating, i.e., if the crypto information server determines that the data requestor is authorized to receive the data, the crypto information server sends the respective data encryption key of the requested data instance portion, along with a message authentication code key of the requested data instance portion, to the data requestor, most preferably in encrypted form. More preferably, the authenticating is in response to the data requestor requesting the respective data encryption key and the respective message authentication code key of the requested data instance portion. Most preferably, each data-encryption-key-message-authentication-code-key pair is associated with a respective identifier that is sent to the data requestor along with the requested data instance portion, and the data requestor requests the respective data encryption key and the respective message authentication code key of the requested data instance portion by sending the associated identifier to the crypto information server. Also even more preferably, the crypto information server stores the data encryption keys, the message authentication code keys and the identifiers in a database, most preferably in encrypted form.

A second basic system of the present invention, for secure collection and distribution of a plurality of instances of data, includes a set of one or more data providers, a data requestor and an archive. The set of data providers capturers the data instances and, for each captured data instance, generates a respective data encryption key and uses that data encryption key to encrypt the data instance, thereby providing respective encrypted data. The data requestor requests at least a portion of one of the data instances. The encrypted data are stored in the archive. In response to the request for the data instance portion, the archive sends the data requestor a corresponding portion of the respective encrypted data of the requested data instance portion.

Although the set of data providers could serve to archive their own encrypted data, especially in an embodiment with only one data provider, it is preferable that the archive be separate from the set of data providers.

Preferably, the set of data providers generates the data encryption keys according to a predefined key granularity.

Preferably, the system also includes a crypto information server that authenticates the data requestor and that, contingent on the authentication (i.e., if the crypto information server determines that the data requestor is authorized to receive the data), sends the respective data encryption key of the requested data instance portion to the data requestor, most preferably in encrypted form.

More preferably, the data requestor also requests the respective data encryption key of the requested data instance portion from the crypto information server, and the authenticating is in response to that request. Even more preferably, the set of data providers associates each data encryption key with a respective identifier, and the archive, in response to the request of the data instance portion by the data requestor, sends the respective identifier of the requested data instance portion to the data requestor along with the requested data instance portion. The data requestor then requests the respective data encryption key of the requested data instance portion from the crypto information server by sending the identifier of the requested data instance portion to the crypto information server.

Most preferably, each data provider, as well as the data requestor, includes a respective instance of a crypto information client that is operative to generate the data encryption keys and the identifiers, to send the data encryption keys and the identifiers to the crypto information server, and to request the data encryption keys from the crypto information server by steps including, for each requested data encryption key, sending the identifier of the requested data encryption key to the crypto information server.

More preferably still, the system also includes a database wherein the crypto information server stores the data encryption keys and the identifiers, most preferably in encrypted form.

Preferably, the set of data providers also generates a respective message authentication code key for each data instance, uses that message authentication code key to generate a respective message authentication code, and attaches the respective message authentication code key thus generated to the data instance prior to encrypting the data instance. Most preferably, the set of data providers generates the message authentication code keys according to a predefined key granularity. The system also includes a crypto information server that authenticates the data requestor and that, contingent on that authentication, sends the respective data encryption key and the respective message authentication code key of the requested data instance portion to the data requestor, most preferably in encrypted form.

Even more preferably, the set of data providers associates each data-encryption-key-message-authentication-code-key pair with a respective identifier, and the archive, in response to the request of the data instance portion by the data requestor, sends the respective identifier of the requested data instance portion to the data requestor along with the requested data instance portion. The data requestor then requests the respective data encryption key and the respective message authentication code key of the requested data instance portion from the crypto information server by sending the identifier of the requested data instance portion to the crypto information server.

Most preferably, each data provider, as well as the data requestor, includes a respective instance of a crypto information client that is operative to generate the data encryption keys, the message authentication code keys and the identifiers, to send the data encryption keys, the message authentication code keys and the identifiers to the crypto information server, and to request the data encryption keys and the message authentication code keys from the crypto information server by steps including, for each requested data-encryption-key-message-authentication-code-key pair, sending the identifier of the requested data-encryption-key-message-authentication-code-key pair to the crypto information server.

More preferably still, the system also includes a database wherein the crypto information server stores the data encryption keys, the message authentication code keys and the identifiers, most preferably in encrypted form.

Blair et al., in US Patent Application Publication No. 2006/0123106, teach a wiretapping device that is intended to be used by law enforcement officials to secretly record conversations legally even before such recording has been authorized by a judge. The device encrypts the conversations immediately upon intercept, using a password that is available to the law enforcement officials only from the judge, and stores the encrypted conversations. Without receiving the password from the judge, the recorded conversations are unintelligible to the law enforcement officials. Unlike the present invention, the device of Blair et al. lacks mandatory end-to-end encryption: having obtained the password, the law enforcement officials are free to decrypt the conversations in-place.

Coordinated Systems, Inc. of East Hartford Conn., USA, offers a data logging and retrieval system called Virtual Observer that is similar to the logging system of the present system, insofar as Virtual Observer encrypts the data immediately on capture and conditions playback of archived data on authentication of the party requesting the playback. However, as far as the present inventors are aware, Virtual Observer sends unencrypted data to authenticated requesting parties and so lacks the end-to-end authentication of the present invention.

BRIEF DESCRIPTION OF THE DRAWINGS

The invention is herein described, by way of example only, with reference to the accompanying drawings, wherein:

FIGS. 7A through 7T, 8A-1 through 8A-28 and 9A through 9N are vendor descriptions of the prior art NICE Perform® system of which the preferred systems of the present invention described herein are improvements.

DESCRIPTION OF THE PREFERRED EMBODIMENTS

The principles and operation of a data collection and distribution system according to the present invention may be better understood with reference to the drawings and the accompanying description.

Figure 1:
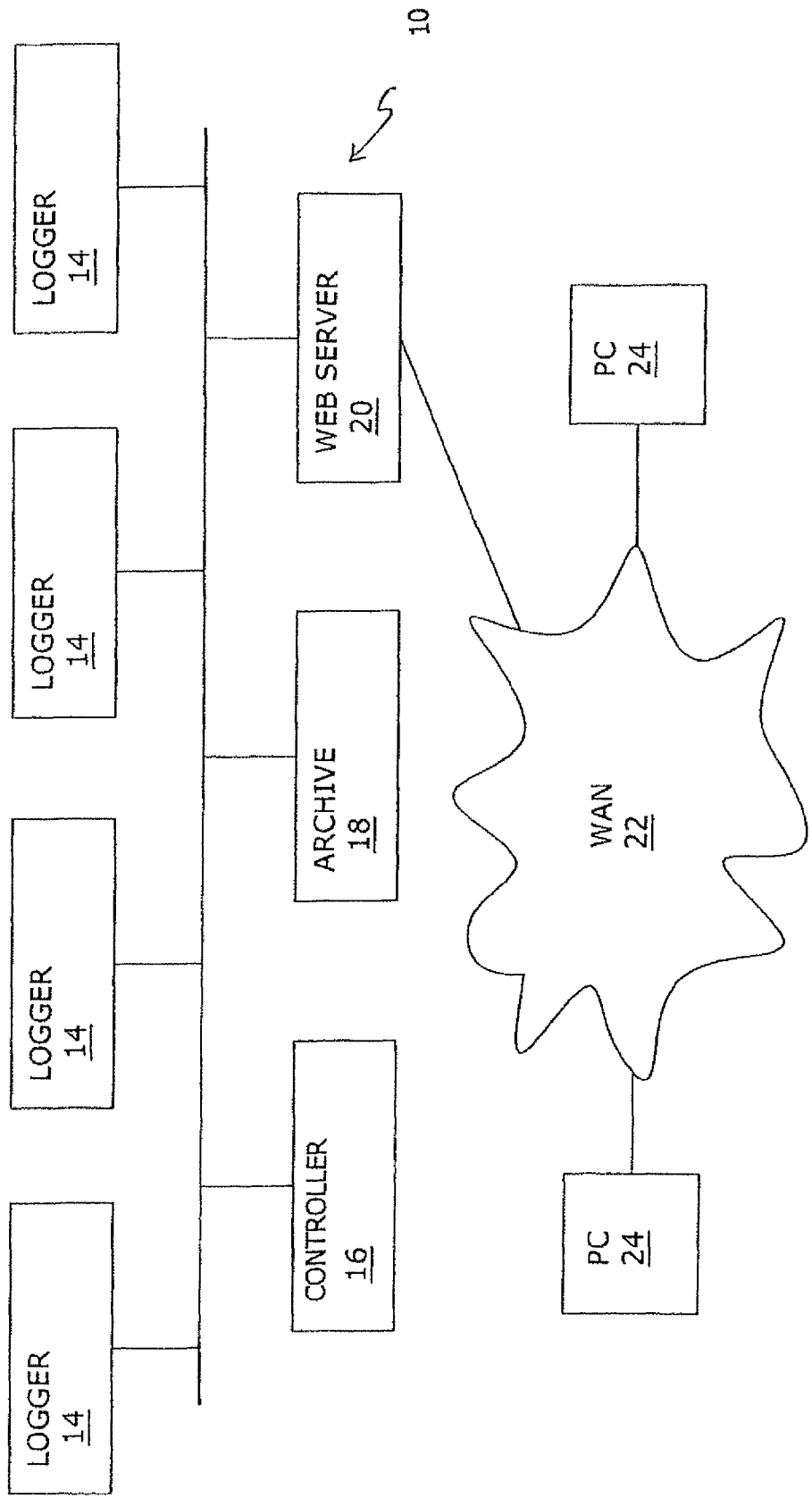
FIG. 1 is a high-level schematic block diagram of a prior art system for capturing, storing and retrieving telephone conversations.
Figure 2:
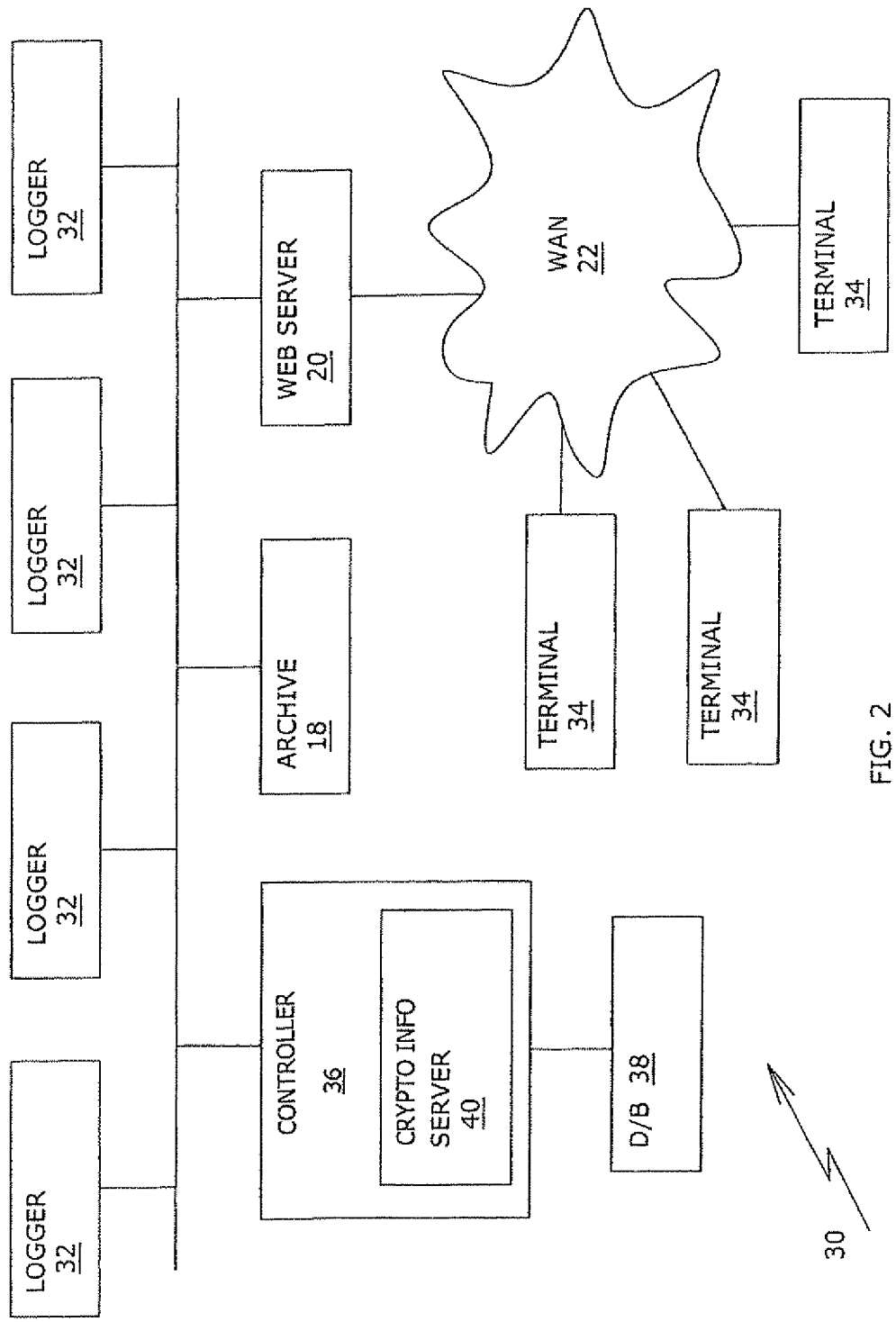
FIG. 2 is a high-level schematic block diagram of the system of FIG. 1 as modified according to the present invention.

Referring again to the drawings, FIG. 2 is a high-level schematic block diagram of a first system 30 of the present invention. Specifically, system 30 is system 10 of FIG. 1 modified according to the principles of the present invention. System 30 inherits LAN 12, archive 18, Web server 20 and WAN 22 from system 10 substantially unchanged. The new components of system 30 include modified loggers 32, modified user terminals 34, a modified controller 36 and a key database 38.

Figure 3:
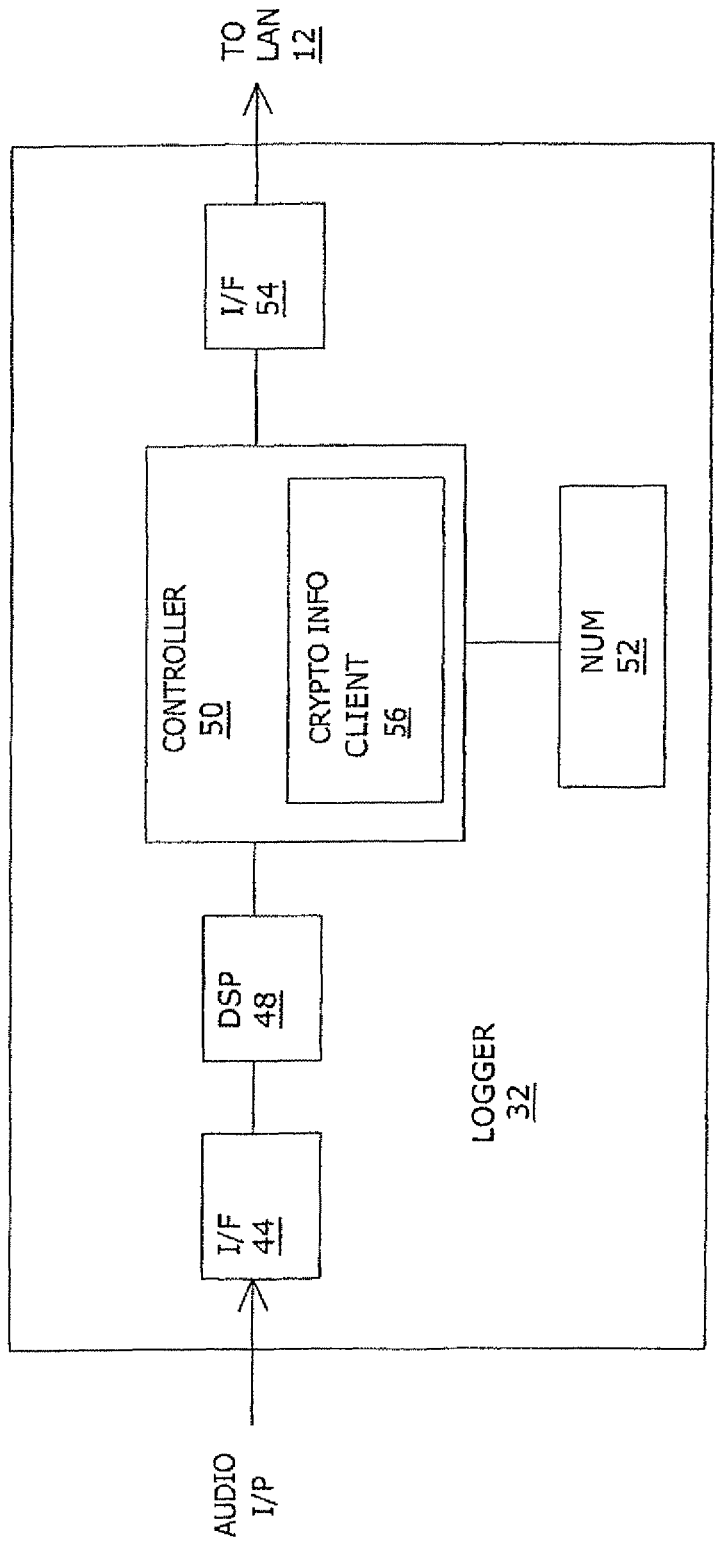
FIG. 3 is a high-level schematic block diagram of a logger of the system of FIG. 2.

FIG. 3 is a high-level schematic block diagram of a logger 32 of the system 30, for logging multichannel audio input. Logger 32 includes an input interface 44 to the audio input, a digital signal processor (DSP) 48, a controller 50, a non-volatile memory 52 and an output interface 54 to LAN 12. Depending on how interface 44 is configured, the audio input could be, for example, analog input, digital extension input, E1/T1 trunk input or VoIP input. Controller 50 is responsible for overall operation of logger 32. One of the features of controller 50 that is relevant to the present invention is that controller 50, with the help of an instance 56 of a crypto information client, as described below, attaches a message authentication code (MAC) to the compressed data that controller 50 receives from DSP 48 and then encrypts the compressed data together with the MAC. Controller 50 stores the encrypted data in non-volatile memory 52 and retrieves the stored encrypted data from non-volatile memory 52. Controller 50 also exchanges data with LAN 12 via interface 54.

Figure 4:
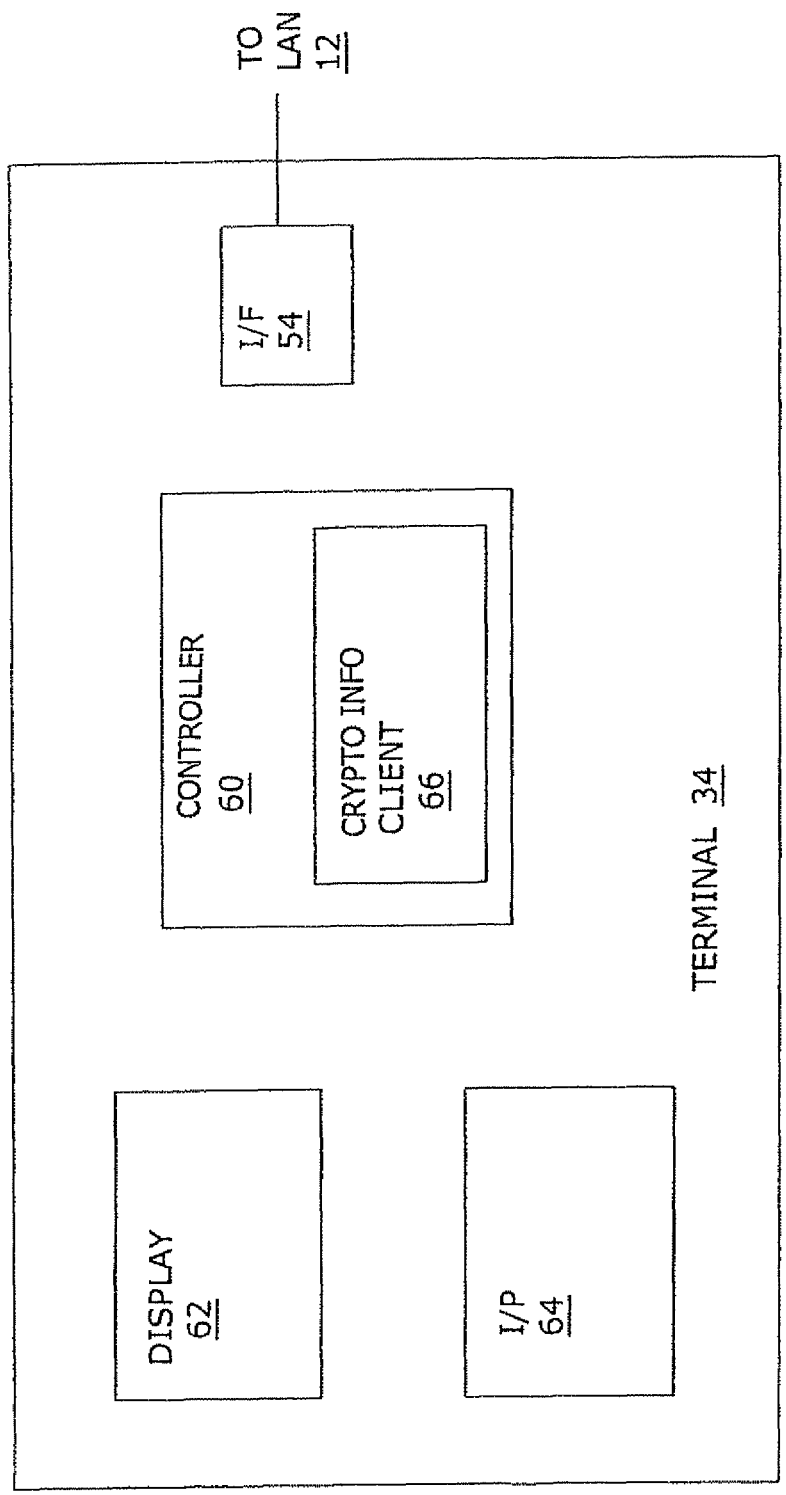
FIG. 4 is a high-level schematic block diagram of a user terminal of the system of FIG. 2.

FIG. 4 is a high-level schematic block diagram of a user terminal 34 of the present invention. Terminal 34 includes an interface 58 to LAN 12, a controller 60, a set of user output devices represented by a display block 62 and a set of user input devices represented by an input block 64. The user input devices represented by input block 64 include standard input devices such as a keyboard and a mouse. The user output devices represented by display block 62 include standard output devices such as a video display screen, a speaker and a printer. Controller 60 is responsible for overall operation of terminal 34. A user of terminal 34 uses input devices 64 to request data for display from web server 20. The data are received via interface 58 and are displayed at one or more of output devices 62. The data are exported in encrypted fault, as described below; and one of the features of controller 60 that is relevant to the present invention is that controller 60, with the help of an instance 66 of a crypto information client, as described below, decrypts the data for display and verifies that the data have not been altered subsequent to their encryption by their source logger 32. Note that in the present context, "displaying" data means presenting the data to a user in a perceptible form: visually at a display screen, audibly via a speaker, etc.

The crypto information client of the present invention has several functions. One of these functions is the generation of the MAC keys that are used by controller 50 to generate MACs and of the data encryption keys that are used by controller 50 to encrypt data. Any conventional real-time symmetric encryption algorithm may be used, but the preferred algorithm is the AES algorithm. Preferably, each MAC key is 128 bits long and each data encryption key is 256 bits long. The data encryption keys and the MAC keys are generated according to a predefined key granularity, for example, per telephone conversation or periodically (e.g. daily or monthly), rather than according to a master key. For each file that controller 50 needs to encrypt, instance 56 of the crypto information client generates an associated MAC key, an associated symmetric data encryption key and a corresponding Global Unique Identifier (GUID). Periodically, for example at the end of a telephone conversation, controller 50 sends the accumulated files and the corresponding GUIDs from non-volatile memory 52 to archive 18 via LAN 12. At the same time, controller 50 sends the associated MAC keys, the associated data encryption keys and the corresponding GUIDs to controller 36 via LAN 12. Crypto information server 40 of controller 36 encrypts the MAC keys and the data encryption keys for storage, along with the corresponding GUIDs, in database 38.

The data that terminal 34 receives from Web server 20 are encrypted and so are useless unless terminal 34 can decrypt the data. Terminal 34 also needs to verify the authenticity of the data, to make sure that the data have not been modified subsequent to their encryption by logger 32. Therefore, another function of the crypto information client of the present invention is fetching MAC keys and data encryption keys from database 38. Terminal 34 receives data files from Web server 20 along with the corresponding GUIDs. For each data file that terminal 34 receives from Web server 20, instance 56 of the crypto information client sends the corresponding GUID to controller 36 with a request for the associated MAC key and the associated data encryption key. Crypto information server 40 negotiates with instance 56 of the crypto information client to authorize the sending of the MAC key and the data encryption key to terminal 34. If terminal 34 is authorized to receive the MAC key and the data encryption key, crypto information server 40 fetches the MAC key and the data encryption key from database 38 according to the GUID received from terminal 34, decrypts the MAC key and the data encryption key and sends the MAC key and the data encryption key to the requesting terminal 34.

Authentication methods suitable for use by crypto information server 40 and instance 56 of the crypto information client are well-known in the art and need not be elaborated herein. For example, in an Active Directory® environment, a protocol such as Kerberos or Integrated Windows Authentication (IWA) is used. In a non-Active-Directory environment, crypto information server 40 and instance 56 of the crypto information client authenticate each other by exchanging public key certificates. In either case, if the authentication is successful, crypto information server 40 sends the requested keys to terminal 34 in encrypted form, albeit encrypted differently than how the keys are stored in database 38. For example, in a non-Active-Directory environment, crypto information server 40 uses a public key algorithm to encrypt the requested keys. After all, if a data encryption key were to be sent to terminal 34 in unencrypted faun, an eavesdropper could use the data encryption key to decrypt the associated data file, thereby circumventing the present invention.

Note that the functionality of the crypto information client is different in terminal 34 than in logger 32. In logger 32, the crypto information client generates the keys and the GUIDs. In terminal 34, the crypto information client uses the GUIDs to fetch the keys. It follows that loggers 32 and terminals 34 could be equipped with different clients. Preferably, however, loggers 32 and terminals 34 use instances of the same crypto information client. This simplifies the design of the present system.

Figure 5:
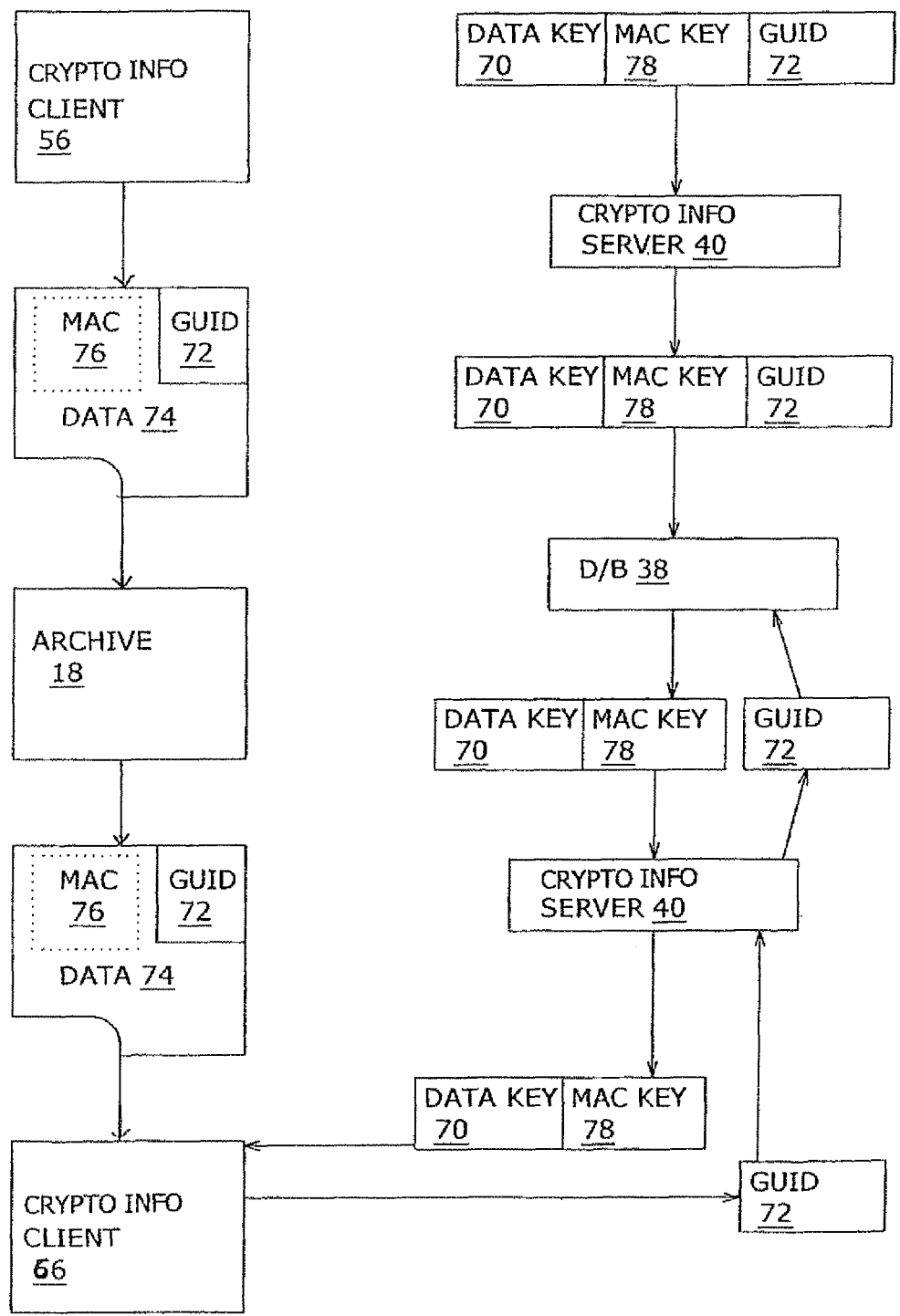
FIG. 5 illustrates the data flow in the system of FIG. 2.

FIG. 5 illustrates the data flow among crypto information server 40 and instances 56 and 66 of the crypto information client according to the present invention. Given a data file to encrypt, instance 56 generates a data encryption key 70 and a corresponding GUID 72. Instance 56 also generates a MAC key 78 that is used to generate a MAC 76 that is embedded in the data file. Data encryption key 70 is used to encrypt the data, including embedded MAC 76, thereby producing an encrypted data file 74. File 74 and GUID 72 are stored in archive 18. Data encryption key 70, MAC key 78 and GUID 72 are sent to crypto information server 40 that stores data encryption key 70, MAC key 78 and QUID 72 in database 38. Upon receipt of encrypted data file 74 and GUID 72 from archive 18, instance 66 sends QUID 72 to crypto information server 40 as part of a request for data encryption key 70. If the request receives authorization, crypto information server 40 fetches data encryption key 70 and MAC key 78 from database 38 according to GUID 72 and sends data encryption key 66 and MAC 78 to instance 66.

The description above of the operation of system 30 is in terms of a single logger 32 and a single user terminal 34. As illustrated in FIG. 2, system 30 almost always includes many loggers 32 and many user terminals 34; but these loggers 32 and user terminals 34 typically operate independently of each other. Crypto information server 40 stores all the encryption keys 70 and all the associated GUIDs 72 in database 38 and sends encryption keys 70 to all terminals 34 contingent on those terminals 34 being authorized to receive encryption keys 70.

Figure 6:
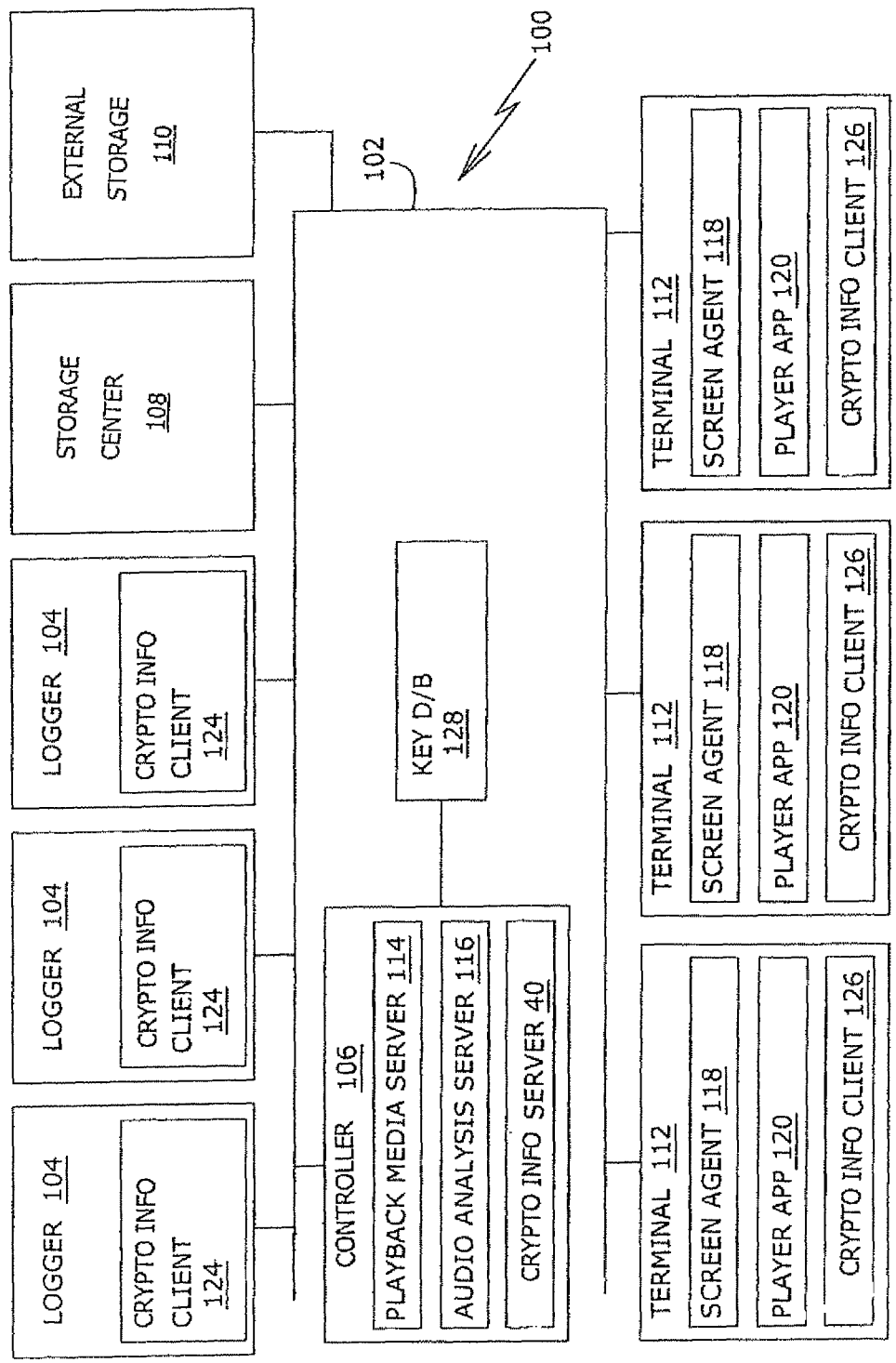
FIG. 6 is a high-level schematic block diagram of a second system of the present invention.
Figure 7A:
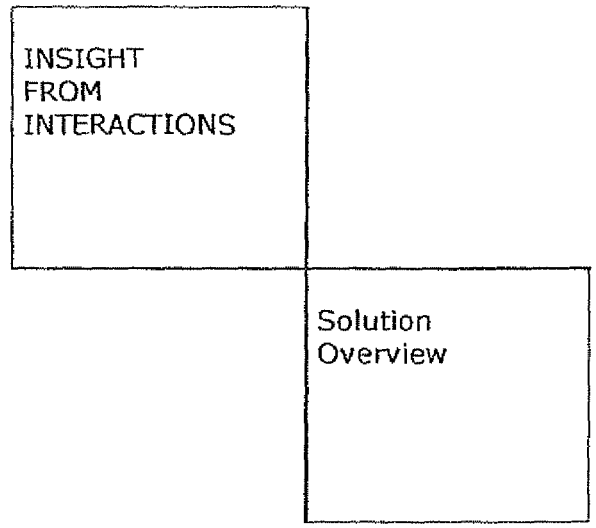
Figures 1, 8A:
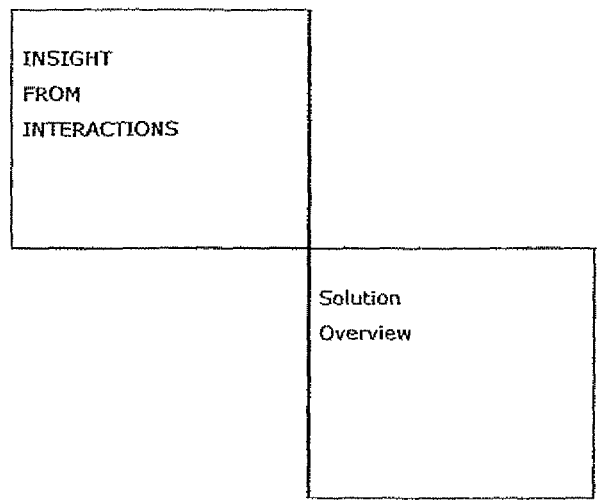
Figures 8, 8A, 9, 10, 11, 12, 13, 14, 15, 16, 17, 18, 19, 20, 21, 22, 23:
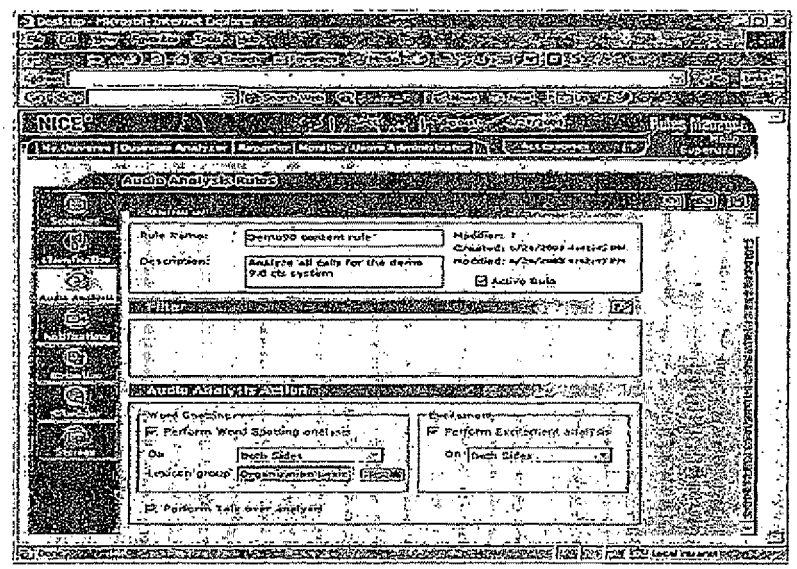
Figures 8, 8A, 9, 10, 11, 12, 13, 14, 15, 16, 17, 18, 19, 20, 21, 22, 23, 24, 25, 26, 27:
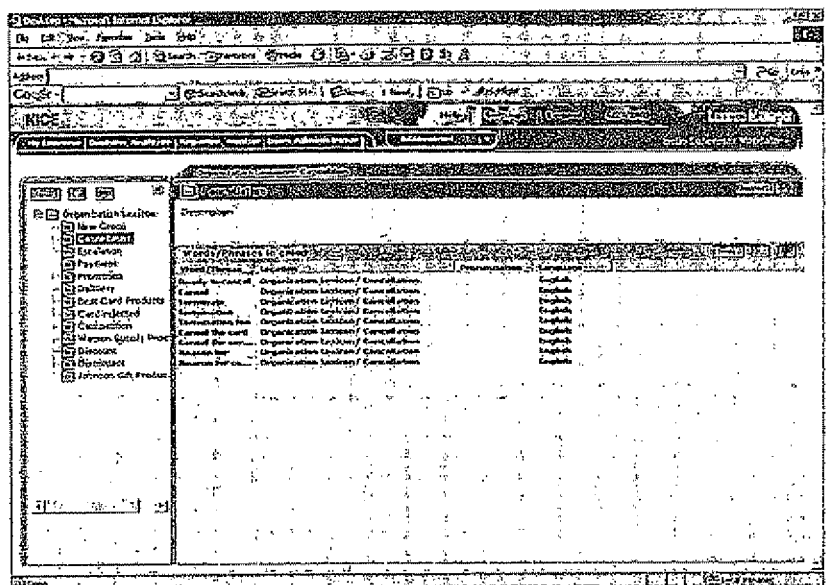
Figure 9A:
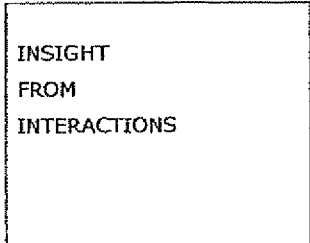
Figure 9A:
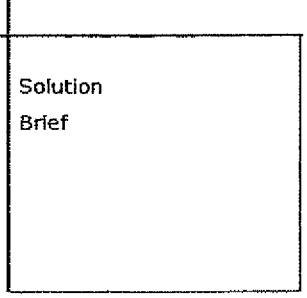

FIG. 6 is a high-level schematic block diagram of a second system 100 of the present invention. System 100 is based on the NICE Perform® system available from NICE Systems Ltd. of Raanana, Israel. Specifically, system 100 is a NICE Perform® system modified according to the principles of the present invention. Like a NICE Perform® system, system 100 includes several multimedia loggers 104, several user terminals 112, a controller 106, a storage center 108 and external storage 110, all communicating with each other via a LAN 102.

Loggers 104 capture whatever kind of multichannel data they are configured to capture: voice, VoIP, video and/or screen capture data. The captured data are stored in storage center 108 that functions in a manner similar to archive 18 of systems 10 and 30. Each user terminal includes a screen agent 118 that sends screen capture data to an associated logger 104 and a player application 120 for playing (i.e., displaying) data fetched from storage center 108. Overall control of system 100 is provided by controller 106 that includes a playback media server 114 that mediates between terminals 112 and their potential data sources (loggers 104 and storage center 108) and an audio analysis server 116 that provides audio analysis capabilities such as speech recognition, excitement detection and talk analysis. Optionally, for efficient operation of storage center 108, captured data also are archived in external storage 110. The functionality listed in this paragraph is standard in NICE Perform® systems. More details may be found in the following three documents that are accessible to authorized distributors and customers of NICE Systems Ltd. at http://www.extranice.com:

NICE Perform™ Architecture Overview
NICE Perform™ Solution Overview
NICE Perform™ Solution Brief To ensure that these three documents remain available for the full life of the patent that is expected to issue from the present patent application, all three documents are reproduced herein in their entirety, as FIGS. 7A through 7T, 8A-1 through 8A-28 and 9A through 9N, respectively.

In addition, loggers 104 include respective instances 124 of a crypto information client of the present invention, user terminals 112 include respective instances 126 of a crypto information client of the present invention and controller 106 includes a crypto information server 122 of the present invention. Crypto information client instances 124 generate data encryption keys and MAC keys for their respective loggers 104. The data encryption keys are generated according to a predefined key granularity. A separate data encryption key and a separate MAC key, with the associated GUID, is generated for each external channel from which data are captured, as well as for each initialization of a screen agent 118. Loggers 104 packetize the captured data, insert respective MACs in the media headers and encrypt the packets to provide encrypted data that are stored in storage center 108 along with associated GUIDs. Controller 106 stores the data encryption keys, the MAC keys and the associated GUIDs in a key database 128. When a user of a user terminal 112 wants to play back stored data, the user fetches the data and its GUID from storage center 108. The user then sends the GUID to controller 106 to request the associated keys. Crypto information client instance 126 of that user terminal 112 negotiates with crypto information server 122 as described above to authorize the sending of the keys to user terminal 112.

While the invention has been described with respect to a limited number of embodiments, it will be appreciated that many variations, modifications and other applications of the invention may be made. For example, the data logging and data storing functionality of logger 32 can be partitioned between a telcom stage and a recorder stage, as taught in the Henits patent.

The invention claimed is:

1. A method for secure recording of screen data, the method comprising the steps of:
generating, at a logger, a data encryption key for each initialization of a screen agent on a terminal, wherein the logger is separate from the terminal and associated with the screen agent on the terminal and receives screen data captured by the screen agent, wherein the data encryption key is used to encrypt according to a predefined granularity the screen data captured as a result of the initialization of the screen agent on the terminal;
using the encryption key to encrypt the screen data to produce encrypted screen data;
associating an identifier with the encryption key and the encrypted screen data;
sending the identifier and the encrypted screen data to an archive; and
sending the identifier and the data encryption key to a crypto information server.

2. The method of claim 1, comprising:
receiving from the archive the encrypted screen data and the identifier;
sending the identifier to the crypto information server;
receiving from the crypto information server the data encryption key; and
decrypting and displaying the screen data.

3. The method of claim 1, comprising, at the crypto information server, authenticating a terminal sending the identifier to the crypto information server.

4. The method of claim 1, comprising receiving the data encryption key in encrypted form.

5. The method of claim 1, comprising:
generating a message authentication code (MAC) key;
using the MAC key to produce a MAC related to the screen data;
attaching the MAC to the screen data prior to encrypting the screen data; and
sending the MAC key to the crypto information server.

6. A method for secure recording of audio data, the method comprising the steps of:
generating a data encryption key for each audio recording channel of a logger, wherein the data encryption key is used to encrypt audio data according to a predefined granularity for the audio recording channel of the logger;
using the encryption key to encrypt the audio data to produce encrypted audio data;
associating an identifier with the encryption key and the encrypted audio data;
sending the identifier and the encrypted audio data to an archive; and
sending the identifier and the data encryption key to a crypto information server.

7. The method of claim 6, comprising:
receiving from the archive the encrypted audio data and the identifier;
sending the identifier to the crypto information server;
receiving from the crypto information server the data encryption key; and
decrypting and audibly presenting the audio data.

8. The method of claim 6, comprising, at the crypto information server, authenticating a terminal sending the identifier to the crypto information server.

9. The method of claim 6, comprising receiving the data encryption key in encrypted form.

10. The method of claim 6, comprising:
generating a message authentication code (MAC) key;
using the MAC key to produce a MAC related to the audio data;
attaching the MAC to the audio data prior to encrypting the audio data; and
sending the MAC key to the crypto information server.

11. A system for secure recording of screen data, the system comprising:
   an archive;
   a crypto information server;
   a data terminal; and
   a logger to:
   generate a data encryption key for encrypting the screen data captured as a result of each initialization of a screen agent on a terminal, wherein the logger is separate from the terminal and associated with the screen agent on the terminal and receives screen data captured by the screen agent and wherein the data encryption key is used to encrypt according to a predefined granularity the screen data captured as a result of the initialization of the screen agent on the terminal;
   use the encryption key to encrypt the screen data to produce encrypted screen data;
   associate an identifier with the encryption key and the encrypted screen data;
   send the identifier and the encrypted screen data to the archive; and
   send the identifier and the data encryption key to the crypto information server.

12. The system of claim 11, wherein the data terminal is to:
   receive from the archive the encrypted screen data and the identifier;
   send the identifier to the crypto information server;
   receive from the crypto information server the data encryption key; and
   decrypt and display the screen data.

13. The system of claim 11, wherein the crypto information server is to authenticate the terminal after the terminal sends the data encryption key to the crypto information server.

14. The system of claim 11, wherein the terminal is to receive the data encryption key in encrypted form.

15. The system of claim 11, wherein the logger is to:
   generate a message authentication code key;
   generate a message authentication code, using the respective message authentication code key; and
   attach the message authentication code to the screen data prior to encrypting the screen data;
   and wherein the system comprises:
   a crypto information server, operative:
   to authenticate the terminal; and
   contingent on the authentication, to send the respective data encryption key and the respective message authentication code key to the terminal.

16. A system for secure recording audio data, the system comprising:
   an archive;
   a crypto information server;
   a data terminal; and
   a logger to:
   generate a data encryption key for each audio recording channel of a logger, wherein the data encryption key is used to encrypt audio data according to a predefined granularity for the audio recording channel of the logger;
   use the encryption key to encrypt the audio data to produce encrypted audio data;
   associate an identifier with the encryption key and the encrypted audio data;
   send the identifier and the encrypted audio data to the archive; and
   send the identifier and the data encryption key to the crypto information server.

17. The system of claim 16, wherein the data terminal is to:
   receive from the archive the encrypted audio data and the identifier;
   send the identifier to the crypto information server;
   receive from the crypto information server the data encryption key; and
   decrypt and audibly present the audio data.

18. The system of claim 16, wherein the crypto information server is to authenticate the terminal after the terminal sends the identifier to the crypto information server.

19. The system of claim 16, wherein the terminal is to receive the data encryption key in encrypted form.

20. The method of claim 1, wherein the granularity is predefined for generating a data encryption key for screen data captured periodically.

21. The method of claim 6, wherein the granularity is predefined for generating a data encryption key for audio data recorded per telephone conversation.

22. The method of claim 6, wherein the granularity is predefined for generating a data encryption key for audio data recorded periodically.

23. A method for secure recording of screen data, the method comprising the steps of:
   generating a separate data encryption key for each initialization of a screen agent on each of a plurality of terminals, wherein the data encryption key is used to encrypt according to a predefined granularity the screen data captured as a result of the initialization of the screen agent on the terminal;
   using the encryption key to encrypt the screen data to produce encrypted screen data;
   associating an identifier with the encryption key and the encrypted screen data;
   sending the identifier and the encrypted screen data to an archive; and
   sending the identifier and the data encryption key to a crypto information server.

* * * * *